(12) United States Patent
Morinaga

(10) Patent No.: US 10,747,041 B2
(45) Date of Patent: Aug. 18, 2020

(54) DISPLAY DEVICE WITH POSITION INPUT FUNCTION

(71) Applicant: Sharp Kabushiki Kaisha, Sakai, Osaka (JP)

(72) Inventor: Junichi Morinaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/483,771

(22) PCT Filed: Feb. 8, 2018

(86) PCT No.: PCT/JP2018/004308
§ 371 (c)(1),
(2) Date: Aug. 6, 2019

(87) PCT Pub. No.: WO2018/150989
PCT Pub. Date: Aug. 23, 2018

(65) Prior Publication Data
US 2019/0391431 A1    Dec. 26, 2019

(30) Foreign Application Priority Data
Feb. 15, 2017 (JP) .................. 2017-025700

(51) Int. Cl.
*G02F 1/1333* (2006.01)
*G06F 3/044* (2006.01)

(52) U.S. Cl.
CPC ........ *G02F 1/13338* (2013.01); *G06F 3/044* (2013.01); *G06F 3/0445* (2019.05)

(58) Field of Classification Search
CPC ..... G02F 1/13338; G06F 3/044; G06F 3/0445
See application file for complete search history.

(56) References Cited

U.S. PATENT DOCUMENTS

2016/0026291 A1    1/2016 Zhao et al.
2017/0115784 A1*   4/2017 Li ................... G02F 1/13338

FOREIGN PATENT DOCUMENTS

CN    105159520 A    12/2015

OTHER PUBLICATIONS

Official Communication issued in International Patent Application No. PCT/JP2018/004308, dated Apr. 24, 2018.

* cited by examiner

*Primary Examiner* — Thanh Nhan P Nguyen
(74) *Attorney, Agent, or Firm* — Keating & Bennett, LLP

(57) ABSTRACT

A display device with a position input function includes pixel electrodes, signal lines, a common electrode, a position detection electrode, and position detection lines. The signal lines are disposed adjacent to the pixel electrodes. The common electrode is disposed to overlap the pixel electrodes via an insulating film. The position detection lines are connected to the one position detection electrode via a contact hole formed in the insulating film that is disposed between the common electrode and the position detection lines. Each of the position detection lines is disposed between the signal line and the pixel electrode such that two of the position detection lines sandwich the pixel electrodes and the signal lines. An interval between two of the signal lines that sandwich the pixel electrodes and the position detection lines is larger than an interval between two of the signal lines that sandwich the pixel electrodes.

15 Claims, 16 Drawing Sheets

DISPLAY DEVICE WITH POSITION INPUT FUNCTION

TECHNICAL FIELD

The present invention relates to a display device with a position input function.

BACKGROUND ART

One example of a liquid crystal display device including an in-cell touch panel is described in Patent Document 1. The liquid crystal display device in Patent Document 1 includes three colors of pixel electrodes, data lines, self-capacitance type touch electrodes, and touch lines. The pixel electrodes include red, green, and blue pixel electrodes. The data lines are adjacent to the pixel electrodes. The touch lines connected to the touch electrodes. Each blue electrode has a footprint smaller than that of each green pixel electrode or each red pixel electrode. The touch lines are disposed adjacent to the blue pixel electrodes.

RELATED ART DOCUMENT

Patent Document

Patent Document 1: Specification of US Unexamined Patent Application Publication No. 2016/0026291

Problem to be Solved by the Invention

In the liquid crystal display device described in Patent Document 1, the footprint of each blue pixel electrode is smaller than the footprint of each pixel electrodes in different colors. Therefore, special adjustment in white balance may be required according to the difference in footprint. Furthermore, it may be difficult to maximize transmissivity. Still furthermore, differences may be created in parasitic capacitances between the pixel electrodes in different colors and the adjacent data lines, resulting in a decrease in display quality.

Disclosure of the Present Invention

The present invention was made in view of the above circumstances. An object is to reduce a decrease in display quality.

Means for Solving the Problem

A display device with a position input function according to the present invention includes pixel electrodes, signal lines, a common electrode, at least one position detection electrode, and position detection lines. The signal lines are configured to transmit signal supplied to the pixel electrodes, respectively, and disposed adjacent to the pixel electrodes. The common electrode is disposed to at least partially overlap the pixel electrodes via an insulating film. The at least one position detection electrode is prepared by dividing the common electrode and configured so that a position input member for position input operation and the at least one position detection electrode form a capacitor to detect a position of input by the position input member. The position detection lines are disposed such that at least the insulating film is disposed between the common electrode and the position detection lines and connected to the at least one position detection electrode via contact holes formed in at least the insulating film. Each of the position detection lines is disposed between corresponding one of the signal lines and corresponding one of the pixel electrodes such that two of the position detection lines sandwich at least some of the pixel electrodes and some of the signal lines. An interval between two of the signal lines that sandwich corresponding one of the pixel electrodes and corresponding one of the position detection lines is larger than an interval between two of the signal lines that sandwich corresponding one of the pixel electrodes.

According to the configuration, potential differences may be created between the pixel electrodes and the common electrode, at least a section of which overlaps the pixel electrodes via the insulating film, based on the signals supplied to the pixel electrodes. Image display is performed using the potential differences. The position detection lines disposed such that the insulating film is disposed between the position detection lines and the common electrode are connected to the at least one position detection electrode prepared by dividing the common electrode via the contact holes. The at least one position detection electrode is for detecting a position of input by the position input member using the signal supplied through the position detection line based on a capacitance between the at least one position detection electrode and the position input member that is for position input operation.

Each of the position detection lines is disposed the corresponding one of the signal lines and the corresponding one of the pixel electrodes. Furthermore, every two of the position detection lines sandwich the multiple pixel electrodes and the multiple signal lines. In comparison to a configuration in which the position detection lines are disposed adjacent to the pixel electrodes, respectively, larger areas can be provided for the pixel electrodes. This configuration is preferable for increasing an aperture ratio. The interval between two of the signal lines that sandwich corresponding one of the pixel electrodes and corresponding one of the position detection lines is larger than the interval between two of the signal lines that sandwich corresponding one of the pixel electrodes. Therefore, An area of each pixel electrode that is adjacent to the position detection line and an area of each electrode that is not adjacent to the position detection line can be equalized. According to the configuration, if display segments controlled by the pixel electrodes exhibit different colors, white balance can be adjusted by regular procedure and display intensity related to the pixel electrodes can be easily maximized. Furthermore, differences in parasitic capacitance are less likely to be created between the pixel electrodes and the source lines. According to the configuration, a decrease in display quality can be reduced.

The following configurations are preferable embodiments of the present invention.

(1) The display device may further include color filters that are disposed to overlap the pixel electrodes and configured to exhibit at least blue, green, and red colors. Each of the position detection lines may be sandwiched between one of the pixel electrodes that overlap one of the color filters that exhibit specified one of the colors and corresponding one of the signal lines. In this configuration, the color filters that exhibit at least the blue, the green, and the red colors are disposed to overlap the pixel electrodes. Therefore, images in specified color can be displayed based on the signals transmitted through the signal lines and supplied to the pixel electrodes. A parasitic capacitance between the source line and the pixel electrode that sandwiches the touch line with the source line may differ from a parasitic capacitance between the source line and the pixel electrode that does not sandwich the position detection line with the source line. The difference may result in a display failure in the former pixel electrode. Because each electrode that sandwiches the corresponding position detection line with the corresponding signal line overlaps the color filter that exhibits the specific one of the colors, even if a display failure is created due to the difference in parasitic capacitance, display failure related to the colors other than the specified one of the colors are less likely to be recognizable. By properly selecting the specified one of the colors, the decrease in display quality can be properly reduced.

(2) The position detection lines may be disposed such that each of the position detection lines sandwiched between one of the pixel electrodes that overlaps one of the color filters that exhibits the blue color and corresponding one of the signal lines. The blue color has lower recognizability in comparison to the green color and the red color. By sandwiching the position detection line between the source line and the pixel electrode that overlaps the color filter that exhibits the blue color, even if the display failure occurs due to the difference in parasitic capacitance, the display failure is less likely to be recognizable. According to the configuration, the decrease in display quality can be properly reduced.

(3) The display device may further include color filters disposed to overlap the pixel electrodes, respectively, and configured to exhibit at least blue, green, and red colors. The position detection lines may be disposed such that the number of the pixel electrodes sandwiched between every two of the position detection lines is a multiple of the number of colors of the color filters. In comparison to a configuration in which the number of the pixel electrodes sandwiched between every two of the position detection lines is equal to the number of colors of the color filters, the number of the position detection line is reduced. Therefore, larger areas can be provided for the pixel electrodes. According to the configuration, the aperture ratio can be further increased.

(4) The signal lines may be disposed adjacent to the pixel electrodes to which the signals are transmitted. Each of the position detection lines may be disposed between corresponding one of the signal lines and corresponding one of the pixel electrodes to which the signals are transmitted through the corresponding one of the signal lines. According to the configuration, when the signals are transmitted through the signal lines, the position detection lines and the common electrode are at the same potential. Therefore, the pixel electrodes to which the signals are not transmitted can be shielded from electric fields from the signal lines by the position detection lines at the same potential as that of the common electrode. According to the configuration, display failures are less likely to be caused by the electric fields from the signal lines. A sum of the parasitic capacitances related to each pixel electrode can be made equal to a sum of the parasitic capacitances related to other pixel electrode. This provides a proper level of display quality.

(5) The position detection lines and the signal lines may be disposed in a layer in which the pixel electrodes are disposed. In this configuration, the insulating film that is disposed between the pixel electrodes and the common electrode is also disposed between the position detection lines and the common electrode and between the signal lines and the common electrode. In comparison to a configuration in which either the position detection lines or the signal lines are disposed on an opposite side from the common electrode relative to the pixel electrodes via the second insulating film, the production cost can be reduced by the cost of the second insulating film that is not required.

(6) The at least one position detection electrode may include position detection electrodes. The position detection lines may be disposed on an opposite side from the common electrode relative to the pixel electrodes via a second insulating film and selectively connected to the position detection electrodes via contact holes of the at least one contact hole formed in the insulating film and the second insulating film. In this configuration, the insulating film and the second insulating film are disposed between the common electrode and the position detection lines. Therefore, the parasitic capacitance between any one of the position detection lines and the position detection electrode that is not connected to the any one of the position detection lines can be further reduced. According to the configuration, proper sensitivity can be achieved in the position detection.

(7) The common electrode may include openings that overlap at least sections of the position detection lines. The signal lines may be disposed on an opposite side from the common electrode relative to the pixel electrodes via a second insulating film. Because the common electrode includes the openings that overlap at least the sections of the position detection lines, the parasitic capacitance between any one of the position detection lines and the position detection electrode that is not connected to the any one of the position detection lines can be reduced. Therefore, proper sensitivity can be achieved in the position detection. When the signals are transmitted through the signal lines, electric fields may be created between the signal lines and hole edges of the holes in the common electrode. The electric fields may induce leakages of light around the openings. Because the second insulating film is disposed between the common electrode and the signal lines in addition to the insulating film, strengths of the electric fields between the signal lines and the common electrode can be reduced. According to the configuration, the signal lines less likely to cause the leakages of light around the holes.

(8) The display device may include a light blocking portion that may include pixel openings that overlap at least sections of the pixel electrodes. The at least one position detection electrode may include position detection electrodes. The position detection lines may be selectively connected to the position detection electrodes via the at least one contact hole. The common electrode may include openings that overlap at least the sections of the position detection lines. Each of the openings may include opening edges that may include a first opening edge and a second opening edge. The first opening edge may be located closer to corresponding one of the pixel electrodes relative to corresponding one of the position detection lines. The second opening edge may be located on an opposite side from the corresponding one of the pixel electrodes relative to the corresponding one of the position detection lines. The first opening edge may be closer to the corresponding one of the position detection lines than the second opening edge. Because the common electrode may include the openings that overlap at least the sections of the position detection lines, a parasitic capacitance between any one of the position detection lines and the position detection electrode that is not connected to the position detection line can be reduced. According to the configuration, proper sensitivity can be achieved in the position detection. If a gap is provided between the opening edge of each opening in the common electrode and corresponding one of the position detection lines in a plan view, a leakage of light is created around the gap due to the an electric field created at the opening edge facing the gap. This may reduce the display quality. To reduce the leakage of light, areas of the light blocking portion may be increased. However, the pixel opening may be reduced in size and thus the aperture ratio may be reduced. In the common electrode, the first opening edge of the opening edges of the opening closer to the at least one pixel electrode relative to the position detection lines is disposed closer to the position detection lines in comparison to the second opening edge on the opposite side from the at least one pixel electrode relative to the position detection lines. Therefore, the leakage of light is less likely to occur on a pixel electrode side relative to the position detection lines. Expansion of the areas of the light blocking portion on the pixel electrode side relative to the position detection lines is not required and thus the pixel opening can be provided in a proper side. Therefore, the aperture ratio is less likely to be reduced.

(9) Each of the pixel electrodes that are adjacent to the position detection lines may have an area about equal to an area of each of the pixel electrodes that may not be adjacent to the position detection lines. According to the configuration, if display segments controlled by the pixel electrodes exhibit different colors, white balance can be adjusted by regular procedure and display intensity related to the pixel electrodes can be easily maximized. Furthermore, differences in parasitic capacitance are less likely to be created between the pixel electrodes and the signal lines. According to the configuration, the decrease in display quality is reduced.

Advantageous Effect of the Invention

According to the present invention, the decrease in display quality is reduced.

MODES FOR CARRYING OUT THE INVENTION

First Embodiment

Figure 1:
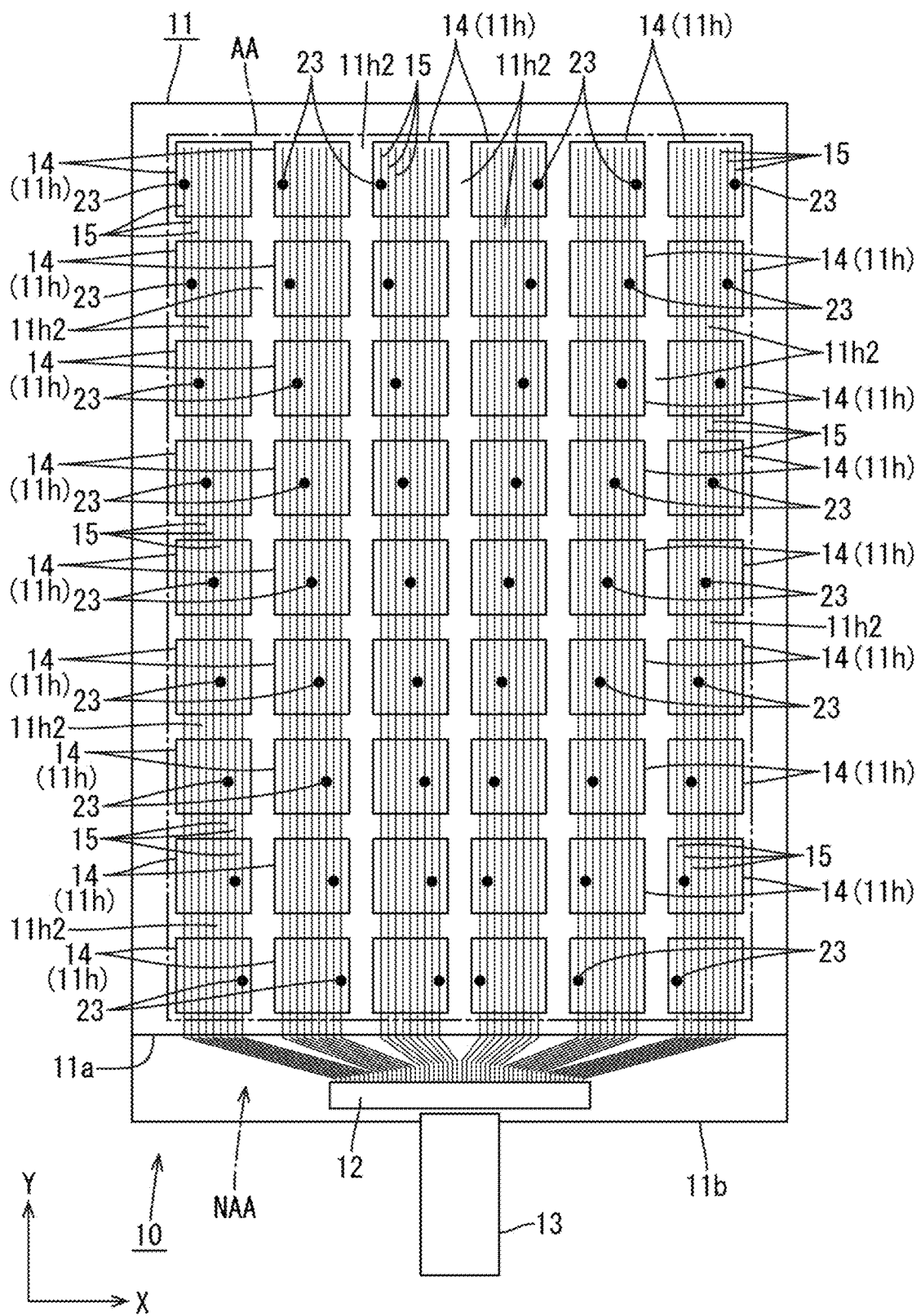
FIG. 1 is a plan view illustrating two-dimensional arrangement of position detection electrodes and position detection lines in a liquid crystal panel in a liquid crystal display device according to a first embodiment of the present invention.

A first embodiment of the invention will be described with reference to FIGS. 1 to 4. In this embodiment section, a liquid crystal display device 10 (a display device with a position input function) with a touch panel function (a position input function) will be described. X-axes, Y-axes, and Z-axes may be present in the drawings. The axes in each drawing correspond to the respective axes in other drawings. An upper side and a lower side in FIGS. 3 and 4 correspond to a front side and a back side of the liquid crystal display device 10, respectively.

As illustrated in FIG. 1, the liquid crystal display device 10 includes at least a liquid crystal panel 11 (a display panel) and a backlight unit (a lighting device). The liquid crystal panel 11 is configured to display images. The backlight unit is an external light source to illuminate the liquid crystal panel 11 for image display. The backlight unit is disposed behind the liquid crystal panel 11. The backlight unit includes light sources configured to emit white light (e.g., LEDs) and optical members for converting the light from the light sources into planar light by applying optical effects to the light from the light sources. The backlight is not illustrated in the drawings.

As illustrated in FIG. 1, an inner area of the liquid crystal panel 11 is configured as a display area AA in which images are displayed (an area defined by a chain line in FIG. 1). An outer area in a frame shape surrounding the display area AA is configured as a non-display area NAA of the liquid crystal panel 11 in which the images are not displayed. In the non-display area NAA, a driver 12 and a flexible substrate 13 that are components for supplying various signals related to a display function and a touch panel function are mounted. The driver 12 is an LSI chip including a driver circuit therein and mounted in the non-display area NAA of the liquid crystal panel 11 through the chip-on-glass (COG) technology. The driver 12 processes the signals transmitted via the flexible substrate 13. The flexible substrate 13 includes a synthetic resin substrate (e.g., polyimide-based resin substrate) having insulating property and flexibility and multiple traces (not illustrated) formed on the substrate. A first end of the flexible substrate 13 is connected to the non-display area NAA of the liquid crystal panel 11 and a second end of the flexible substrate 13 is connected to a control circuit board (a signal source). The signals from the control circuit board are transmitted to the liquid crystal panel 11 via the flexible substrate 13, processed by the driver 12 in the non-display area NAA, and output to the display area AA.

Figure 3:
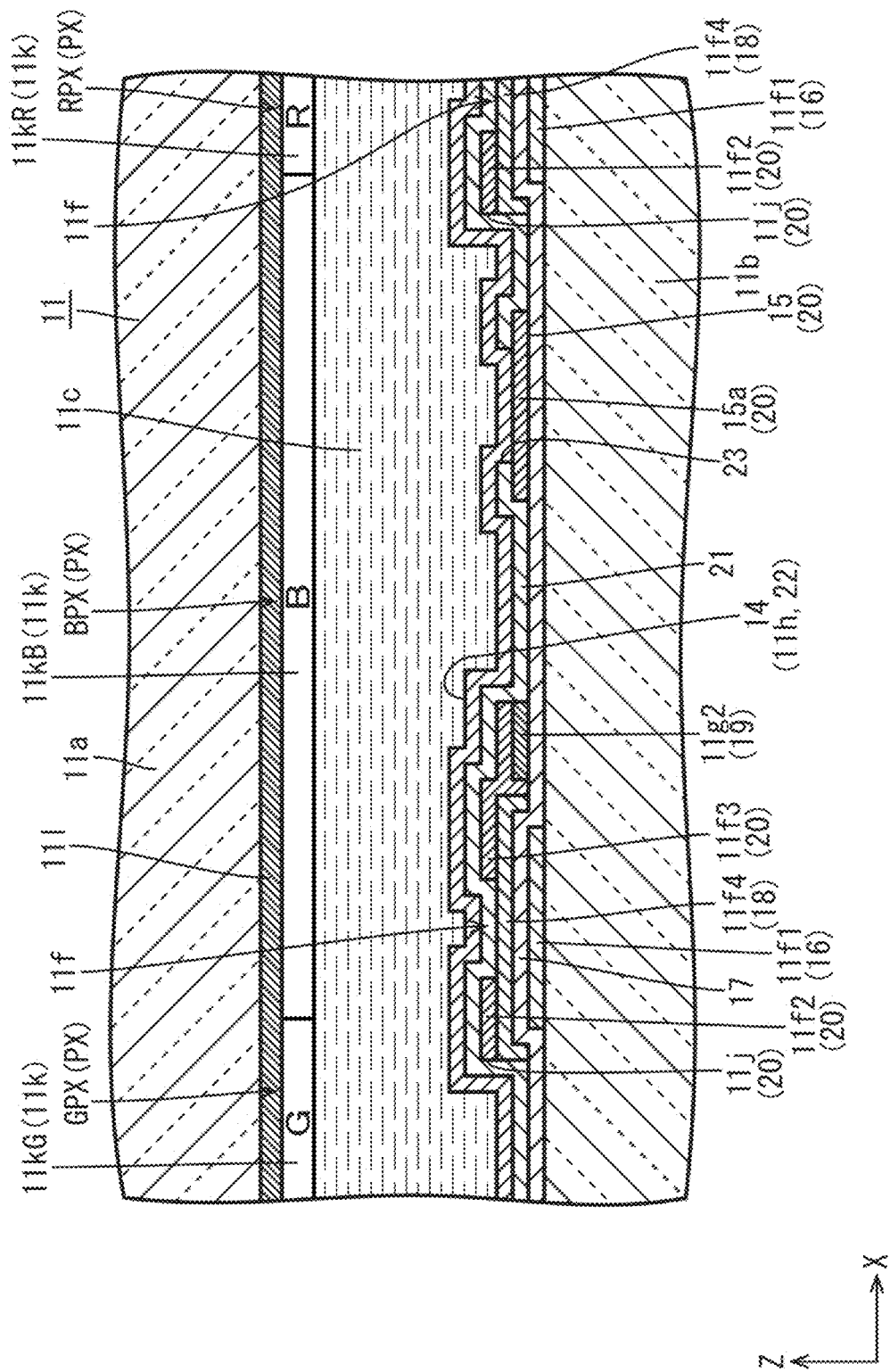
FIG. 3 is a cross-sectional view along line A-A in FIG. 2.

The liquid crystal panel 11 will be described in detail. As illustrated in FIG. 3, the liquid crystal panel 11 includes a pair of substrates 11a and 11b and a liquid crystal layer 11c (a medium layer) between the substrates 11a and 11b. The liquid crystal layer 11c includes liquid crystal molecules that are substances having optical characteristics that change according to application of an electric field. The liquid crystal layer 11c is surrounded by a sealing member, which is not illustrated, disposed between the substrates 11a and 11b. The liquid crystal layer 11c is sealed by the sealing member. One of the substrates 11a and 11b on the front side is a CF substrate 11a (a common substrate) and the other on the rear side (back side) is the array substrate 11b (an active matrix substrate, a component substrate). The CF substrate 11a and the array substrate 11b include substantially transparent glass substrates and various films formed in layers on the glass substrates. Polarizing plates, which are not illustrated, are attached to outer surfaces of the substrates 11a and 11b.

Figure 2:
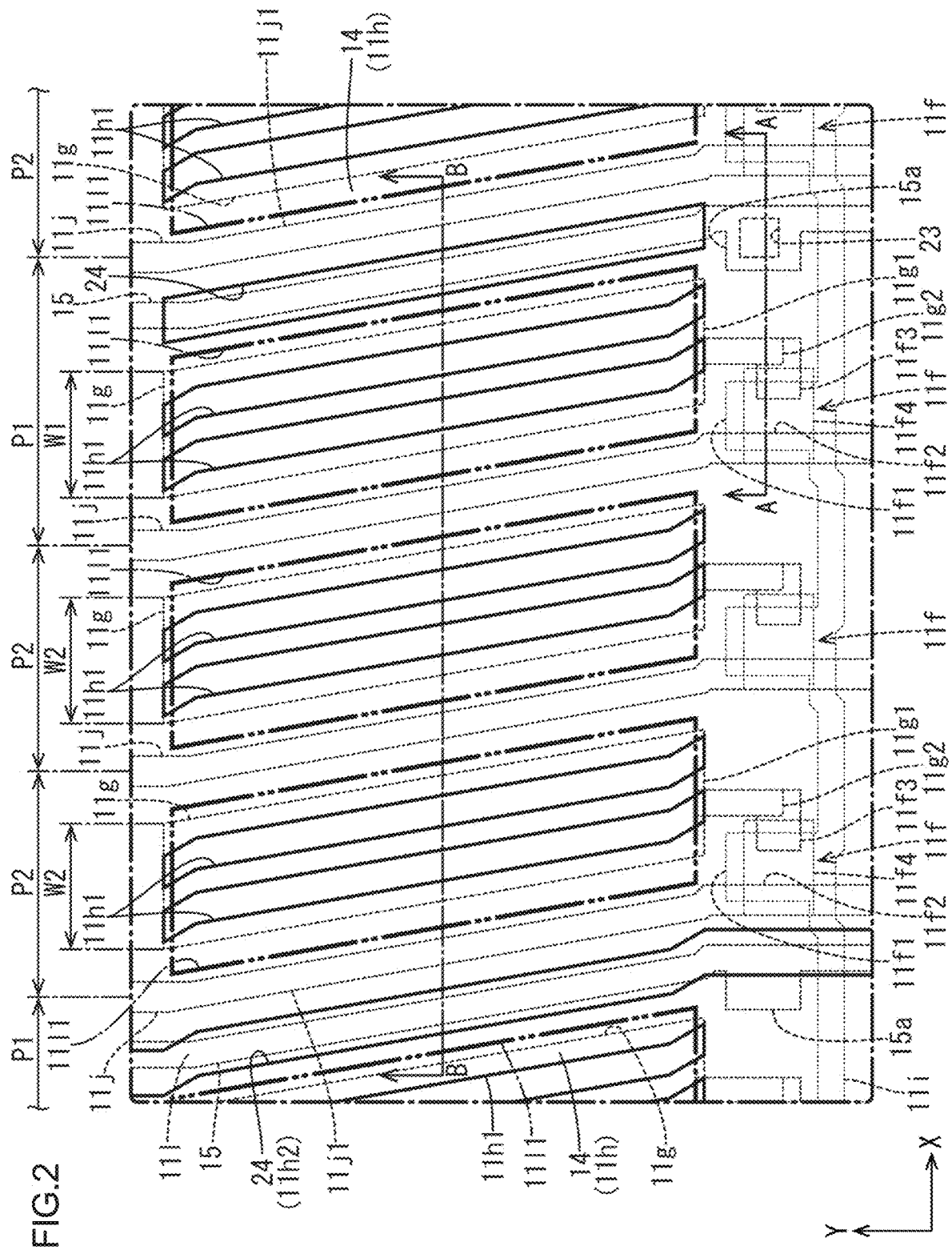
FIG. 2 is a plan view illustrating pixel electrodes in an array substrate included in the liquid crystal panel.

As illustrated in FIG. 2, thin film transistors (TFTs) 11f (switching components) and pixel electrodes 11g are arranged in a matrix in an area of an inner surface of the array substrate 11b (on a liquid crystal layer 11c side, on an opposed surface side opposed to the CF substrate 11a) in the display area AA. Lines of the TFTs 11f and lines of the pixel electrodes 11g are arranged along the X-axis direction and the Y-axis direction. Gate lines 11i (scanning lines) and source lines 11j (signal lines, data lines) are routed perpendicular to each other to surround the TFTs 11f and the pixel electrodes 11g. The gate lines 11i extend substantially straight in a direction substantially along the X-axis direction to be adjacent to lower ends of the pixel electrodes 11g to be driven in FIG. 2. The source lines 11j extend in a direction substantially along the Y-axis direction to be adjacent to left sides of the pixel electrodes 11g to which image signals (signals, data signals) are supplied in FIG. 2. Specifically, portions of the source lines 11j adjacent to the pixel electrodes 11g (diagonally extending portions 11j1) extend in a diagonal direction angled to the X-axis direction and the Y-axis direction. Portions of the source lines 11j not adjacent to the pixel electrodes 11g (including portions that cross the gate lines 11i) linearly extend along the Y-axis direction. The gate lines 11i are connected to gate electrodes 11f1 of the TFTs 11f and the source lines 11j are connected to source electrodes 11f2 of the TFTs 11f. The pixel electrodes 11g are connected to drain electrodes 11f3 of the TFTs 11f. The TFTs 11f are driven based on signals supplied to the gate lines 11i and the source lines 11j. Through the driving of the TFTs 11f, application of potentials to the pixel electrodes 11g is controlled. Each of the pixel electrodes 11g has a vertically-long parallelogram shape in a plan view. The source lines 11j are disposed between the pixel electrodes 11g that are adjacent to each other in a direction along short edges of the pixel electrodes 11g (the X-axis direction). The gate lines 11i are disposed between the pixel electrodes 11g that are adjacent to each other in a direction along long edges of the pixel electrodes 11g (the Y-axis direction). The long edges of the pixel electrodes 11g are parallel to the diagonally extending portions 11j1 of the source lines 11j.

Figure 4:
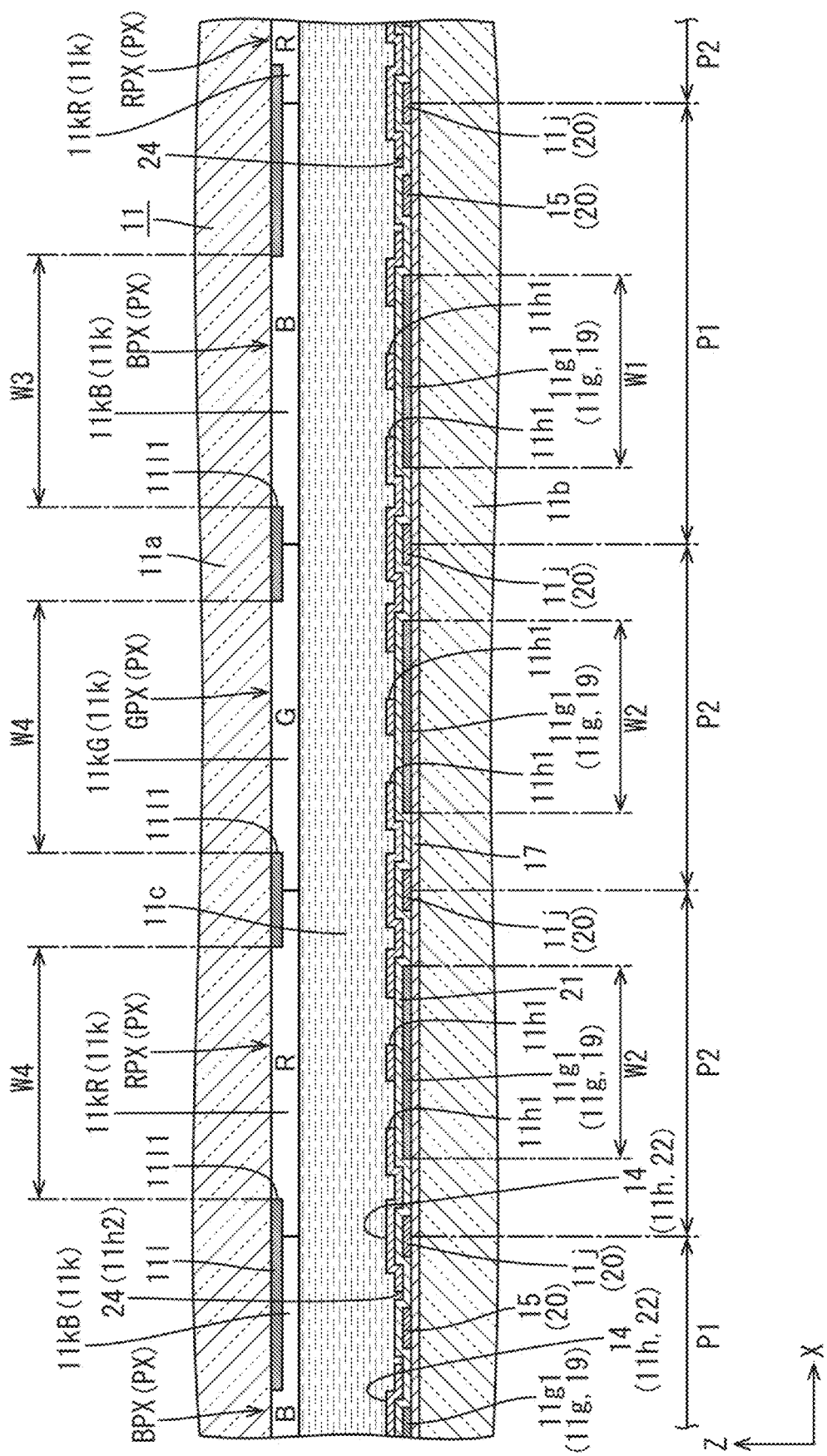
FIG. 4 is a cross-sectional view along line B-B in FIG. 2.

As illustrated in FIGS. 2 and 4, a common electrode 11h is formed to overlap all pixel electrodes 11g in a layer upper than the pixel electrodes 11g (closer to the liquid crystal layer 11c) in the display area AA on an inner surface side of the array substrate 11b. The common electrode 11h spreads over substantially an entire area of the display area AA to apply a reference voltage that is normally about constant. The common electrode 11h includes pixel overlapping openings 11h1 (pixel overlapping slits, alignment control slits) are formed in areas overlapping the pixel electrodes 11g (two pixel overlapping openings in each overlapping area in FIG. 2). Each of the pixel overlapping openings 11h1 has a vertically-long shape. The pixel overlapping openings 11h1 extend along the diagonally extending portions 11j1 of the source lines 11j (long edges of the pixel electrodes 11g). When a potential difference occurs between the pixel electrode 11g and the common electrode 11h that overlap each other as the pixel electrode 11g is charged, a fringe electric field (an oblique electric field) is created between an opening edge of the pixel overlapping opening 11h1 and the pixel electrode 11g. The fringe electric field includes a component parallel to the plate surface of the array substrate 11b and a component normal to the plate surface of the array substrate 11b. With the fringe electric field, orientations of the liquid crystal molecules included in the liquid crystal layer 11c can be controlled. Namely, the liquid crystal panel 11 according to this embodiment operates in fringe field switching (FFS) mode. In this embodiment, two pixel overlapping openings 11h1 are provided. However, the alignment control function and the display function can be exerted with at least one pixel overlapping opening 11h1. The direction in which the pixel overlapping openings 11h1 extend is not limited to one direction. In one pixel PX, the pixel overlapping opening 11h1 may dogleg. Alternatively, the pixel overlapping openings 11h1 in the pixels PX adjacent to each other in the Y-axis direction may extend in different directions.

As illustrated in FIG. 4, color filters ilk that exhibit three different colors of blue (B), green (G), and red (R) are disposed in the display area AA on the inner surface side of the CF substrate 11a. The color filters ilk that exhibit different colors are repeatedly arranged along the gate lines 11i (in the X-axis direction) and the color filters ilk are arranged in lines along the source lines 11j (substantially the Y-axis direction). Namely, the color filters 11k are arranged in a stripe as a whole. The color filters ilk include blue color filters 11kB that exhibit blue, green color filters 11kG that exhibit green, and red color filters 11kR that exhibit red. The color filters ilk that are adjacent to each other in the X-axis direction and exhibit different colors each other are arranged such that a boundary therebetween (a color boundary) overlap the source lines 11j and a light blocking portion 11l. The color filters 11k and the pixel electrodes 11g on the array substrate 11b are disposed to overlap each other in a plan view. The color filters 11k form pixels PX together with the pixel electrodes 11g. More specifically, the blue color filters 11kB and the pixel electrodes 11g that are opposed to the blue color filters 11kB form blue pixels BPX, respectively. The green color filters 11kG and the pixel electrodes 11g that are opposed to the green color filters 11kG form green pixels GPX, respectively. The red color filters 11kR and the pixel electrodes 11g that are opposed to the red color filters 11kR for red pixels RPX, respectively. In the liquid crystal panel 11, the B pixels BPX, the G pixels GPX, and the R pixels RPX that are adjacent to one another in the X-axis direction form display pixels configured to perform color display in predefined tones. An interval of the pixels PX in the X-axis direction is about 10 μm to 30 μm.

As illustrated in FIGS. 2 and 4, the light blocking portion 11l (an inter-pixel portion, a black matrix) configured to block light is formed in the display area AA on the inner surface side of the CF substrate 11a. The light blocking portion 11l is formed in a grid pattern in a plan view to separate the adjacent pixels PX (the pixel electrodes 11g). The light blocking portion 11l includes pixel openings 11l1 at positions overlapping large areas of the pixel electrodes 11g on the array substrate 11b side in a plan view. The pixel openings 11l1 are arranged in a matrix within the plate surface of the CF substrate 11a. The numbers of the pixel openings 11l1 are arranged in the X-axis direction and the Y-axis direction. Each pixel opening 11l1 has a vertically-long rectangular two-dimensional shape along an outline of the pixel electrode 11g. The pixel opening 1111 has a short dimension larger than the short dimension of the pixel electrode 11g and a long dimension slightly smaller than the long dimension of the pixel electrode 11g. The pixel openings 1111 pass light therethrough for display at the pixels PX. The light blocking portion 111 restricts light from traveling between the adjacent pixels PX to ensure independency of tones of each pixel PX. Especially, sections of the light blocking portion 111 extending along the source lines 11j reduce color mixture between the pixels BPX, GPX, and RPX that exhibit different colors. The light blocking portion 111 overlaps at least the gate lines 11i and the source lines 11j on the array substrate 11b in a plan view. Alignment films (not illustrated) for orienting the liquid crystal molecules in the liquid crystal layer 11c are formed on innermost surfaces of the substrates 11a and 11b in contact with the liquid crystal layer 11c. A planarization film may be formed between the alignment film and the color filters 11k.

The liquid crystal panel 11 according to this embodiment has a display function for displaying images and a touch panel function (a position input function) for detecting positions of input by a user performs based on displayed images (input positions). The liquid crystal panel 11 includes an integrated touch panel pattern (with an in-cell technology) for exerting the touch panel function. The touch panel pattern uses so-called a projection type electrostatic capacitance method. A self-capacitance method is used for detection. As illustrated in FIG. 1, the touch panel pattern includes touch electrodes 14 (position detection electrodes) are disposed on the array substrate 11b of the pair of substrates 11a and 11b and arranged in a matrix within the plate surface of the array substrate 11b. The touch electrodes 14 are disposed in the display area AA of the array substrate 11b. The display area AA of the liquid crystal panel 11 substantially corresponds with a touch area in which input positions are detectable (a position input area). The non-display area NAA substantially corresponds with a non-touch area in which input positions are not detectable (a non-position input area). When the user intends to input a position based on a displayed image in the display area AA of the liquid crystal panel 11 recognized by the user and brings his or her finger (a position input body), which is a conductive member but not illustrated, closer to the surface of the liquid crystal panel 11 (a display surface), the finger and the touch electrode 14 forma capacitor. A capacitance measured at the touch electrode 14 close to the finger changes as the finger approaches to the touch electrode 14 is different from a capacitance at the touch electrodes 14 farther from the finger. Based on the difference in capacitance, the input position can be detected.

As illustrated in FIG. 1, the touch electrodes 14 are prepared from the common electrode 11h on the array substrate 11b. The common electrode 11h includes dividing openings 11h2 (dividing slits) for separating the adjacent touch electrodes 14 from each other in addition to the pixel overlapping openings 11h1. The dividing openings 11h2 include portions that cross the common electrode 11h in the X-axis direction for an entire length of the common electrode 11h and portions that cross the common electrode 11h in the Y-axis direction for an entire length of the common electrode 11h. The dividing openings 11h2 form a grid in a plan view. The common electrode 11h includes the touch electrodes 14 that are separated from one another by the dividing openings 11h2 to form the grid in the plan view and electrically independent from one another. In the display area AA, lines of the touch electrodes 14 separated by the dividing openings 11h2 are arranged in the X-axis direction and the Y-axis direction, that is, the touch electrodes 14 are arranged in a matrix. Each of the touch electrodes 14 has a rectangular shape in the plan view with edges in some millimeters (e.g., about 2 to 4 mm). The touch electrodes are significantly larger than the pixels PX (the pixel electrodes 11g) in the plan view. Namely, each touch electrode 14 is disposed in an area that straddles more than one pixel PX in the X-axis direction and the Y-axis direction (e.g., tens of or millions of the pixels PX). Touch lines 15 (position detection lines) on the array substrate 11b are selectively connected to the touch electrodes 14. The touch lines 15 extend parallel to the source lines 11j on the array substrate 11b substantially along the Y-axis direction. The touch lines are connected to the specific touch electrodes 14 among the touch electrodes 14 arranged in the Y-axis direction. The touch lines 15 are connected to a detection circuit, which is not illustrated. The detection circuit may be included in the driver 12 or provided outside the liquid crystal panel 11 via the flexible substrate 13. The touch lines 15 supply reference potential signals for the display function and touch signals for the touch function (position detection signals) to the touch electrodes 14 at different timing. The reference potential signals are transmitted to the touch lines 15 at the same timing and thus all the touch electrodes 14 have the reference potential and function as the common electrode 11h. FIG. 1 schematically illustrates arrangement of the touch electrodes 14. The number and the arrangement of the touch electrodes 14 can be altered from those illustrated in the drawings where appropriate.

Films disposed on top of each other on the inner surface of the array substrate 11b will be described. As illustrated in FIG. 3, a first metal film 16 (a first conductive film), a gate insulating film 17, a semiconductor film 18, a first transparent electrode film 19, a second metal film 20 (a second conductive film), an interlayer insulating film 21 (an insulating film), and a second transparent electrode film 22 are stacked on the array substrate 11b in this sequence from a lower layer. The first metal film 16 may be a single-layer film made of one kind of metal, a multilayer film made of a material containing different kinds of metals, or an alloy. The first metal film 16 has conductivity and light blocking properties. The gate lines 11i and the gate electrodes 11f1 of the TFTs 11f are portions of the first metal film 16. The gate insulating film 17 is made of an inorganic material such as silicon nitride ($SiN_x$) and silicon oxide ($SiO_2$). The gate insulating film 17 insulates the first metal film 16 in the lower layer from the semiconductor film 18, the first transparent electrode film 19, and the second metal film 20 in the upper layer. The semiconductor film 18 is a thin film made of an oxide semiconductor material or amorphous silicon. Channels 11f4 (semiconductor portions) connected to the source electrodes 11f2 and the drain electrodes 11f3 in the TFTs 11f are portions of the semiconductor film 18. The first transparent electrode film 19 is made of a transparent electrode film (e.g., indium tin oxide (ITO)). The pixel electrodes 11g are portions of the first transparent electrode film 19. Similar to the first metal film 16, the second metal film 20 may be a single-layer film made of one kind of metal, a multilayer film made of a material containing different kinds of metals, or an alloy. The second metal film 20 has conductivity and light blocking properties. The source lines 11j, the touch lines 15, and the source electrodes 11f2 and the drain electrodes 11f3 of the TFTs 11f are portions of the second metal film 20. Similar to the gate insulating film 17, the interlayer insulating film 21 is made of an inorganic material such as silicon nitride ($SiN_x$) and silicon oxide ($SiO_2$). The interlayer insulating film 21 insulates the semiconductor film 18, the first transparent electrode film 19, and the second metal film 20 in the lower layer from the second transparent electrode film 22 in the upper layer. The second transparent electrode film 22 is made of a transparent electrode material similar to the first transparent electrode film. The common electrode 11h (the touch electrodes 14) is prepared from the second transparent electrode film 22.

Configurations of the TFTs 11f and the pixel electrodes 11g will be described in detail. As illustrated in FIGS. 2 and 3, the TFTs 11f include the gate electrodes 11f1 that branch off from the gate lines 11i. The gate electrodes 11f1 protrude from sections of the gate lines 11i crossing the source lines 11j along the Y-axis direction toward the pixel electrodes 11g to be connected. Each of the gate electrodes 11f1 has a rectangular shape in a plan view. The gate electrodes 11f1 are provided for driving the TFTs 11f based on the scan signals supplied to the gate lines 11i to control currents between the source electrodes 11f2 and the drain electrodes 11f3. The TFTs 11f includes the source electrodes 11f2 that are sections of the source lines 11j overlapping the gate electrodes 11f1. The sections of the source electrodes 11f2 linearly extend in the Y-axis direction. The TFTs 11f include the drain electrodes 11f3 disposed at distances from the source electrodes 11f2. Each of the drain electrodes 11f3 has an L shape in the plan view. The drain electrodes 11f3 include first ends opposed to the source electrodes 11f2 and connected to the channels 11f4 and second ends connected to the pixel electrodes 11g. The second ends of the drain electrodes 11f3 prepared from the second metal film 20 directly contact the pixel electrodes 11g prepared from the first transparent electrode film 19 and disposed immediately below the drain electrodes 11f3.

As illustrated in FIGS. 2 and 3, the pixel electrodes 11g include pixel electrode bodies high and contact portions 11g2. The pixel electrode bodies 11g1 overlap the pixel openings 111l of the light blocking portion 11l. Each of the pixel electrode bodies 11g1 has a parallelogram shape. The contact portions 11g2 protrude from the pixel electrode bodies 11g1 in the Y-axis direction toward the TFTs 11f. The contact portions 11g2 are connected to the drain electrodes 11f3. The TFTs 11f include the channels 11f4 that overlap the gate electrodes 11f1 via the gate insulating film 17 and connected to the source electrodes 11f2 and the drain electrodes 11f3. The channels 11f4 extend in the X-axis direction to cross the gate electrodes 11f1. First ends and second ends of the channels 11f4 are connected to the source electrodes 11f2 and the drain electrodes 11f3, respectively. When the TFTs 11f turn on based on the scan signals supplied to the gate electrodes 11f1, image signals (signals, data signals) supplied to the source lines 11j are transmitted from the source electrodes 11f2 to the drain electrodes 11f3 via the channels 11f4 prepared from the semiconductor film 18. As a result, the pixel electrodes 11g are charged.

Next, a configuration of the touch lines 15 will be described in detail. As illustrated in FIGS. 2 and 4, the touch lines 15 are portions of the second metal film 20, the portions of which are configured as the source lines 11j. Similar to the first transparent electrode film 19, the touch lines 15 are laid on the interlayer insulating film 21 in the upper layer. Namely, the touch lines 15, the source lines 11j, and the pixel electrodes 11g, which are the portions of the first transparent electrode film 19, are disposed in the same layer. Therefore, short circuits are less likely to occur among them by separating them in the X-axis direction (a direction that crosses a direction in which the source lines 11j and the touch lines 15 extend) with gaps. The touch lines 15 that are the portions of the second metal film 20 having the light blocking properties are disposed not to overlap the pixel electrodes 11g. Therefore, the aperture ratio of the pixels PX is less likely to unnecessarily decrease and a decrease in display quality due to parasitic capacitances between the pixel electrodes 11g and the touch lines 15 is less likely to occur. Each of the touch lines 15 has a width about equal to the width of the source lines 11j.

As illustrated in FIGS. 2 and 4, the touch lines 15 are disposed between the source lines 11j and the pixel electrodes 11g with respect to the X-axis direction. The touch lines 15 are arranged at intervals with multiple pixel electrodes 11g and source lines between every two touch lines 15. Specifically, three pixel electrodes 11g and three source lines 11j are sandwiched between every two of the touch lines 15 that are arranged at intervals with respect to the X-axis direction. The number of the pixel electrodes 11g or the source lines 11j is equal to the number of the color filters 11k. Three pixel electrodes 11g sandwiched between two touch lines 15 are components of the blue pixel BPX, the green pixel GPX, and the red pixel RPX, respectively. In comparison to a configuration in which touch lines are adjacent to the pixel electrodes 11g, respectively, the number of the touch lines 15 and spaces in which the touch lines 15 are disposed are reduced. Therefore, larger spaces can be provided for the pixel electrodes 11g. This configuration is preferable for increasing the aperture ratio of the pixels PX.

As illustrated in FIGS. 2 and 3, the touch lines 15 prepared from the second metal film 20 are connected to the relevant touch electrodes 14 via contact holes 23 in the interlayer insulating film 21. The touch lines 15 include sections adjacent to the TFTs 11f (the drain electrodes 11f3) in the X-axis direction and having a larger width. The sections that are defined as wide sections 15a function as connecting pads for the touch electrodes 14. The wide sections 15a of the touch lines 15 that cross multiple TFTs 11f that arranged in the Y-axis direction are located adjacent to the respective TFTs 11f. The contact holes 23 are provided for one of or some of the wide sections 15a. The touch lines 15 extend in the Y-axis direction to cross all the touch electrodes 14. However, the touch lines 15 are connected to the specific touch electrodes 14. The relevant touch lines 15 and the non-relevant touch lines 15 overlap the touch electrodes 14 via the interlayer insulating film 21.

As illustrated in FIGS. 2 and 4, an interval P1 between two source lines 11j between which the corresponding pixel electrode 11g and the corresponding touch line 15 are disposed is larger than an interval P2 between two source lines 11j between which the corresponding pixel electrode 11g is disposed but not the touch line 15. Namely, the intervals between the pixels PX include two different intervals. Specifically, the interval P1 between two source lines 11j between which the corresponding pixel electrode 11g and the corresponding touch line 15 are sandwiched is larger than the interval P2 between two source lines 11j between which the corresponding pixel electrode 11g is sandwiched but not the touch line 15 by about a sum of the width of the touch line 15 and a distance between the touch line 15 and the source line 11j. Among the pixel electrodes 11g that are arranged in the X-axis direction, a width W1 (a dimension in the X-axis direction) and an area of each pixel electrode 11g adjacent to the touch line 15 are about equal to a width W2 and an area of each pixel electrode 11g that is not adjacent to the touch line 15 ("about equal" means completely equal or within tolerance). Each of the TFTs 11f connected to the pixel electrode 11g that is adjacent to the touch line 15 has a structure (or a shape), a size, and electrical characteristics equal to those of each of the TFTs 11*f* that is connected to the pixel electrode 11*g* that is not adjacent to the touch line 15. According to the configuration, special adjustment in white balance is not required for image display by the pixels BPX, GPX, and RPX and regular adjustment is sufficient. Display intensity related to each pixel electrode 11*g* can be easily maximized. Furthermore, differences in parasitic capacitance between the pixel electrodes 11*g* and the corresponding source lines 11*j* or the corresponding gate lines 11*i* are less likely to be created. The pixel electrode 11*g* that is adjacent to the touch line 15 is sandwiched between the source line 11*j* and the touch line 15 with respect to the X-axis direction. The pixel electrode 11*g* that is not adjacent to the touch line 15 is sandwiched between two source lines 11*j* with respect to the X-axis direction. As illustrated in FIG. 4, among the pixel openings 1111 in the light blocking portion 111 of the CF substrate 11*a*, each pixel opening 1111 that overlaps the corresponding pixel electrode 11*g* that is adjacent to the touch line 15 has a width W3 that is equal to a width W4 of each pixel opening 1111 that overlaps the corresponding pixel electrode 11*g* that is not adjacent to the touch line 15. According to the configuration, the aperture ratios (opening areas) of the pixels BPX, GPX, and RPX are equalized. Therefore, a decrease in display quality is reduced.

As illustrated in FIG. 4, each touch lines 15 is sandwiched between the pixel electrode 11*g* that overlaps the corresponding blue color filter 11*k*B among the pixel electrodes 11*g* that are arranged in the X-axis direction and the corresponding source line 11*j*. Namely, the pixel electrodes 11*g* that overlap the respective blue color filters 11*k*B are adjacent to the touch lines 15 (sandwiched between the respective touch lines and the respective source lines 11*j*). The pixel electrodes 11*g* that overlap the respective green color filters 11*k*G and the pixel electrodes 11*g* that overlap the respective red color filters 11*k*R are not adjacent to the touch lines 15 (sandwiched between the respective source lines 11*j*). A parasitic capacitance between the source line 11*j* and the pixel electrode 11*g* that sandwiches the touch line 15 with the source line may differ from a parasitic capacitance between the source line 11*j* and the pixel electrode 11*g* that does not sandwich the touch line 15 with the source line 11*j*. The difference may result in display failure in the former pixel electrode 11*g*. Specifically, if a method of cancelling the parasitic capacitance between the source line 11*j* and the adjacent pixel electrode 11*g* by alternately supplying signals with reversed polarities to the source lines 11*j* that are arranged in the X-axis direction is used, the parasitic capacitance between the source line 15 and the pixel electrode 11*g* that sandwiches the touch line 15 with the source line 11*j* may be larger than the parasitic capacitance between the source line 15 and the pixel electrode 11*g* that does not sandwich the touch line 15 with the source line 11*j*. The difference may result in display failure in the former pixel electrode 11*g*. Each pixel electrode 11*g* that is sandwiched between the source line 11*j* and the touch line 15 overlaps the blue color filter 11*k*B that has lower recognizability (lower noticeability, lower visibility) in comparison to the green color filters 11*k*G and the red color filters 11*k*R. Therefore, even if the display failure occurs due to the difference in parasitic capacitance, the display failure is less likely to be recognizable. According to the configuration, the decrease in display quality can be properly reduced.

As illustrated in FIG. 2, each source line 11*j* is adjacent to the pixel electrode 11*g* to which the signal is supplied (a component to be connected). Each touch line 15 is disposed between the pixel electrode 11*g* to which a signal that is transmitted through the source line 11*j* is not supplied (a component not to be connected) and the source line 11*j*. The expression "the pixel electrode 11*g* to which a signal transmitted through the source line 11*j* is supplied" means that the pixel electrode 11*g* is electrically connected to the source line 11*j* that transmits the signal via the TFT 11*f*. The expression "the pixel electrode 11*g* to which the signal that is transmitted through the source line 11*j* is not supplied" means that the pixel electrode 11*g* is not electrically connected to the source line 11*j* that transmits the signal via the TFT 11*f*. The touch line 15 is disposed adjacent to the source line 11*j* with a gap on an opposite side from the pixel electrode 11*g* to which the source line 11*j* is electrically connected via the TFT 11*f*. According to the configuration, during the signal is transmitted through the source line 11*j* (a display period), a reference potential signal is supplied to the touch line 15 and the potential at the touch line 15 is the reference potential, that is, the common electrode 11*h* and the touch line 15 are at the same potential. Namely, the pixel electrode 11*g* to which the signal is not transmitted through the source line 11*j* can be shielded from an electric field (a source electric field) created by the source line 11*j* by the touch line 15 that is at the potential same as the common electrode 11*h*. This reduces alignment failures in alignment of the liquid crystal molecules in the liquid crystal layer 11*c* due to the source electric field. A sum of the parasitic capacitances related to each pixel electrode 11*g* can be made equal to a sum of the parasitic capacitances related to other pixel electrode 11*g*. This provides a proper level of display quality.

As illustrated in FIG. 4, the touch lines 15 and the source lines 11*j* are prepared from the second metal film 20 as described earlier and disposed in the layer in which the pixel electrodes 11*g* prepared from the first transparent electrode film 19 are disposed. The interlayer insulating film 21 is disposed between the touch lines 15 and the common electrode 11*h* and between the source lines 11*j* and the common electrode 11*h*. The common electrode 11*h* is prepared from the second transparent electrode film 22. The interlayer insulating film 21 is disposed between the pixel electrode 11*g* and the common electrode 11*h*. In comparison to a configuration in which the touch lines and the source lines are disposed in a layer lower than the pixel electrodes 11*g* (on an opposite side from the common electrode 11*h*, on the rear side) via the second interlayer insulating film, the above configuration does not require the second interlayer insulating film and thus the production cost can be reduced by the cost of the second insulating film.

As illustrated in FIGS. 2 and 4, the common electrode 11*h* including the touch electrodes 14 includes openings 24 at least partially overlapping the touch lines 15. The openings 24 extend substantially in the Y-axis direction and parallel to the touch lines 15. Each of the openings 24 is vertically long in the plan view (elongated in the extending direction of the touch lines 15). The long dimension (a dimension in the Y-axis direction) of each of the openings 24 (except for the dividing openings 11*h*2, which will be described later) is smaller than the long dimension of each of the pixel electrodes 11*g* and about equal to the long dimension of each of the pixel overlapping openings 11*h*1 of the common electrode 11*h*. The width of each of the openings 24 (a dimension in the X-axis direction) is larger than the width of the source lines 11*j* or the width of the touch lines 15 and about equal to the width of the pixel overlapping openings 11*h*1 of the common electrode 11*h*. With the openings 24, parasitic capacitances that may appear between the touch lines 15 and the non-relevant touch electrodes 14 can be reduced. Therefore, proper sensitivity in detection of position input by the finger can be achieved.

As illustrated in FIG. 2, the dividing openings 11$h$2 of the common electrode 11$h$ separating the adjacent touch electrodes 14 from each other function as the openings 24. Namely, the dividing openings 11$h$2 are located to overlap the touch lines 15 (portions of the touch lines 15 closer to the source lines 11$j$ in the X-axis direction). The dividing openings 11$h$2 extend in the Y-axis direction for the entire length of the display area AA, that is, the dividing openings 11$h$2 overlap the touch lines 15 for the entire length of the touch lines 15. With the dividing openings 11$h$2 that are existing structures, parasitic capacitances that may appear between the touch lines 15 and the touch electrodes 14 that are not connected to the touch lines 15 can be reduced. The openings 24 of the common electrode 11$h$ except for the dividing openings 11$h$2 are aligned with the pixel overlapping openings 11$h$1 with respect to the Y-axis direction (the direction perpendicular to the arrangement direction relative to the pixel overlapping openings 11$h$1). In comparison to a configuration in which the openings are not aligned with the pixel overlapping openings 11$h$1 with respect to the Y-axis direction, the openings 24 and the pixel overlapping openings 11$h$1 can be efficiently arranged. Furthermore, electrical resistances related to the touch electrodes 14 prepared by dividing the common electrode 11$h$ can be reduced.

As described above, the liquid crystal display device 10 (the display device with the position input function) according to this embodiment includes the pixel electrodes 11$g$, the source lines 11$j$ (the signal lines), the common electrode 11$h$, the touch electrodes 14 (the position detection electrodes), and the touch lines 15 (the position detection lines). The source lines 11$j$ transmit the signals supplied to the pixel electrodes 11$g$, respectively. The source lines 11$j$ are disposed adjacent to the pixel electrodes 11$g$. The common electrode 11$h$ is disposed to overlap at least the sections of the pixel electrodes 11$g$ via the interlayer insulating film 21 (the insulating film). The touch electrodes 14 (the position detection electrodes) are prepared by dividing the common electrode 11$h$ and configured so that the finger, which is the position input member, and the corresponding touch electrode 14 form a capacitor to detect a position of input by the finger, which is the position input member. At least the interlayer insulating film 21 is disposed between the common electrode 11$h$ and the touch lines 15. The touch lines 15 are connected to the touch electrodes 14 via the contact hole 23 formed at least in the interlayer insulating film 21. The touch lines 15 are disposed between the source lines 11$j$ and the pixel electrodes 11$g$ such that every two of the touch lines 15 sandwich at least multiple pixel electrodes 11$g$ and multiple source lines 11$j$. The source lines 11$j$ are arranged at intervals such that the interval between the source lines 11$j$ that sandwich the pixel electrode 11$g$ and the touch line 15 is larger than the interval between the source lines 11$j$ that sandwich the pixel electrode 11$g$.

According to the configuration, potential differences may be created between the pixel electrodes 11$g$ and the common electrode 11$h$ including the sections that overlap the pixel electrodes 11$g$ via the interlayer insulating film 21 based on the signals supplied to the pixel electrodes 11$g$ via the source lines 11$j$. The image display is performed using the potential differences. The touch lines 15 are connected to the touch electrodes 14 via the contact holes 23. The touch electrodes 14 are prepared by dividing the common electrode 11$h$ and disposed such that the interlayer insulating film 21 is disposed between the common electrode 11$h$ and the touch electrodes 14. With the touch electrodes 14, a position of input by the finger, which is the position input member for the input, is detected based on a capacitance between the corresponding touch electrode 14 and the finger using the signals supplied to the touch electrodes 14 through the touch lines 15.

The touch lines 15 are disposed between the source lines 11$j$ and the pixel electrodes 11$g$ such that every two of the touch lines 15 sandwich multiple pixel electrodes 11$g$ and multiple source lines 11$j$. In comparison to a configuration in which the touch lines 15 are disposed adjacent to the pixel electrodes 11$g$, respectively, larger areas can be provided for the pixel electrodes 11$g$. This configuration is preferable for increasing the aperture ratio. The interval between the source lines 11$j$ that sandwich the pixel electrode 11$g$ and the touch line 15 is larger than the interval between the source lines 11$j$ that sandwich the pixel electrode 11$g$ but not the touch line 15. The pixel electrodes 11$g$ that are adjacent to the touch lines 15 and the pixel electrodes 11$g$ that are not adjacent to the touch lines 15 can be equalized in size. According to the configuration, if display segments controlled by the pixel electrodes 11$g$ exhibit different colors, white balance can be adjusted by regular procedure and display intensity related to the pixel electrodes 11$g$ can be easily maximized. Furthermore, differences in parasitic capacitance are less likely to be created between the pixel electrodes 11$g$ and the source lines 11$j$. According to the configuration, the decrease in display quality is reduced.

The color filters 11$k$ that exhibit at least blue, green, and red colors are disposed to overlap the pixel electrodes 11$g$, respectively. Each touch line 15 is sandwiched between the corresponding pixel electrode 11$g$ that overlaps the color filter 11$k$ that exhibits specific one of the colors among the pixel electrodes 11$g$ and the corresponding source line 11$j$. Because the color filters 11$k$ that exhibit at least blue, green, and red colors are disposed to overlap the pixel electrodes 11$g$, images in specific colors can be displayed based on the signals supplied to the pixel electrodes 11$g$ through the source lines 11$j$. A parasitic capacitance between the source line 11$j$ and the pixel electrode 11$g$ that sandwiches the touch line 15 with the source line 11$j$ may differ from a parasitic capacitance between the source line 11$j$ and the pixel electrode 11$g$ that does not sandwiches the touch line 15 with the source line 11$j$. The difference may result in display failure in the former pixel electrode 11$g$. Each pixel electrode 11$g$ that is sandwiched between the source line 11$j$ and the touch line 15 overlaps the color filter 11$k$B that exhibits the specific one of the colors. Therefore, even if the display failure occurs due to the difference in parasitic capacitance, the display failure related to colors other than the specific one of the colors is less likely to be recognizable. By properly selecting the specific one of the colors, the decrease in display quality can be further reduced.

Each touch line 15 is disposed between the pixel electrode 11$g$ that overlaps the blue color filter 11$k$B that exhibits blue color among the pixel electrodes 11$g$ and the source line 11$j$. The blue color has lower recognizability in comparison to the green color and the red color. By sandwiching the touch line 15 between the source line 11$j$ and the pixel electrode 11$g$ that overlaps the blue color filter 11$k$B that exhibits the blue color, even if the display failure occurs due to the difference in parasitic capacitance, the display failure is less likely to be recognizable. According to the configuration, the decrease in display quality can be properly reduced.

The source lines 11$j$ are disposed adjacent to the pixel electrodes 11$g$ to which the signals are transmitted through the source lines 11$j$. The touch lines 15 are disposed between the source lines 11*j* and the pixel electrodes 11*g* to which the signals are not transmitted through the source lines 11*j*. When the signals are transmitted through the source lines 11*j*, the touch lines 15 and the common electrode 11*h* are at the same potential. Therefore, the pixel electrodes 11*g* to which the signals are not transmitted through the source lines 11*j* can be shielded from the electric fields created by the source lines 11*j* (the source electric fields) by the touch lines 15 that are at the same potential with the common electrode 11*h*. This reduces alignment failures in alignment of the liquid crystal molecules in the liquid crystal layer 11*c* due to the source electric fields. The sum of the parasitic capacitances related to each pixel electrode 11*g* can be made equal to the sum of the parasitic capacitances related to other pixel electrode 11*g*. This provides a proper level of display quality.

The touch lines 15, the source lines 11*j*, and the pixel electrodes 11*g* are disposed in the same layer. According to the configuration, the interlayer insulating film 21 that is disposed between the common electrode 11*h* and the pixel electrodes 11*g* is disposed between the common electrode 11*h* and the touch lines 15 and between the common electrode 11*h* and the source lines 11*j*. In comparison to a configuration in which either the touch lines or the source lines are disposed on the opposite side from the common electrode 11*h* relative to the pixel electrode 11*g* via the second interlayer insulating film, the production cost can be reduced by the cost of the second insulating film that is not required.

The areas of the pixel electrodes 11*g* that are adjacent to the touch lines 15 are about equal to the areas of the pixel electrodes 11*g* that are not adjacent to the touch lines 15. If the display segments that are controlled by the pixel electrodes 11*g* exhibit different colors, white balance can be adjusted by regular procedure and display intensity related to the pixel electrodes 11*g* can be easily maximized. Furthermore, differences in parasitic capacitance are less likely to be created between the pixel electrodes 11*g* and the source lines 11*j*. According to the configuration, the decrease in display quality is reduced.

Second Embodiment

A second embodiment of the present invention will be described with reference to FIGS. 5 and 6. The second embodiment includes touch lines 115 in arrangement different from the first embodiment. Configurations, functions, and effects similar to those of the first embodiment may not be described.

Figure 5:
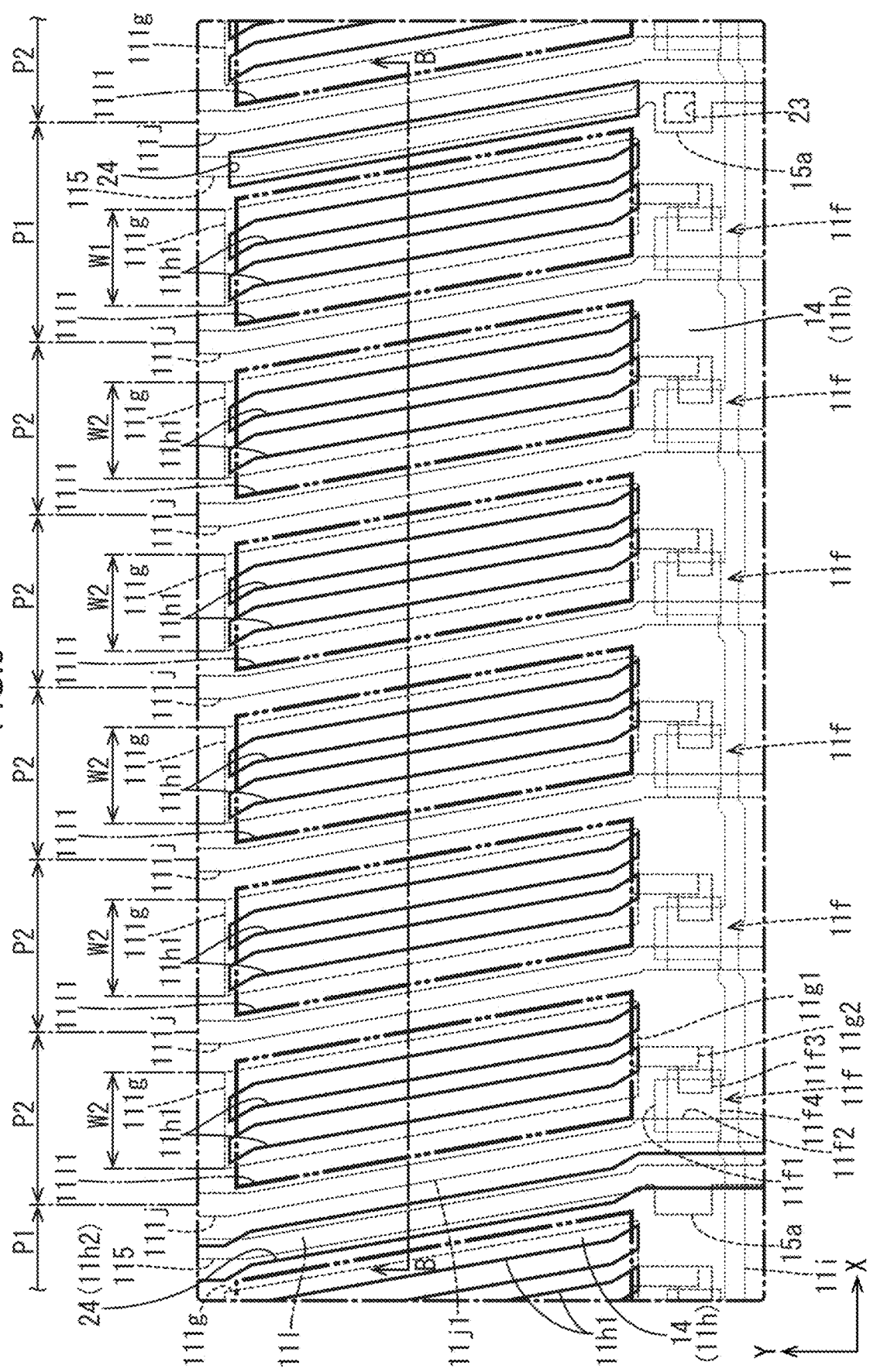
FIG. 5 is a plan view illustrating arrangement of pixels in an array substrate included in a liquid crystal panel according to a second embodiment of the present invention.
Figure 6:
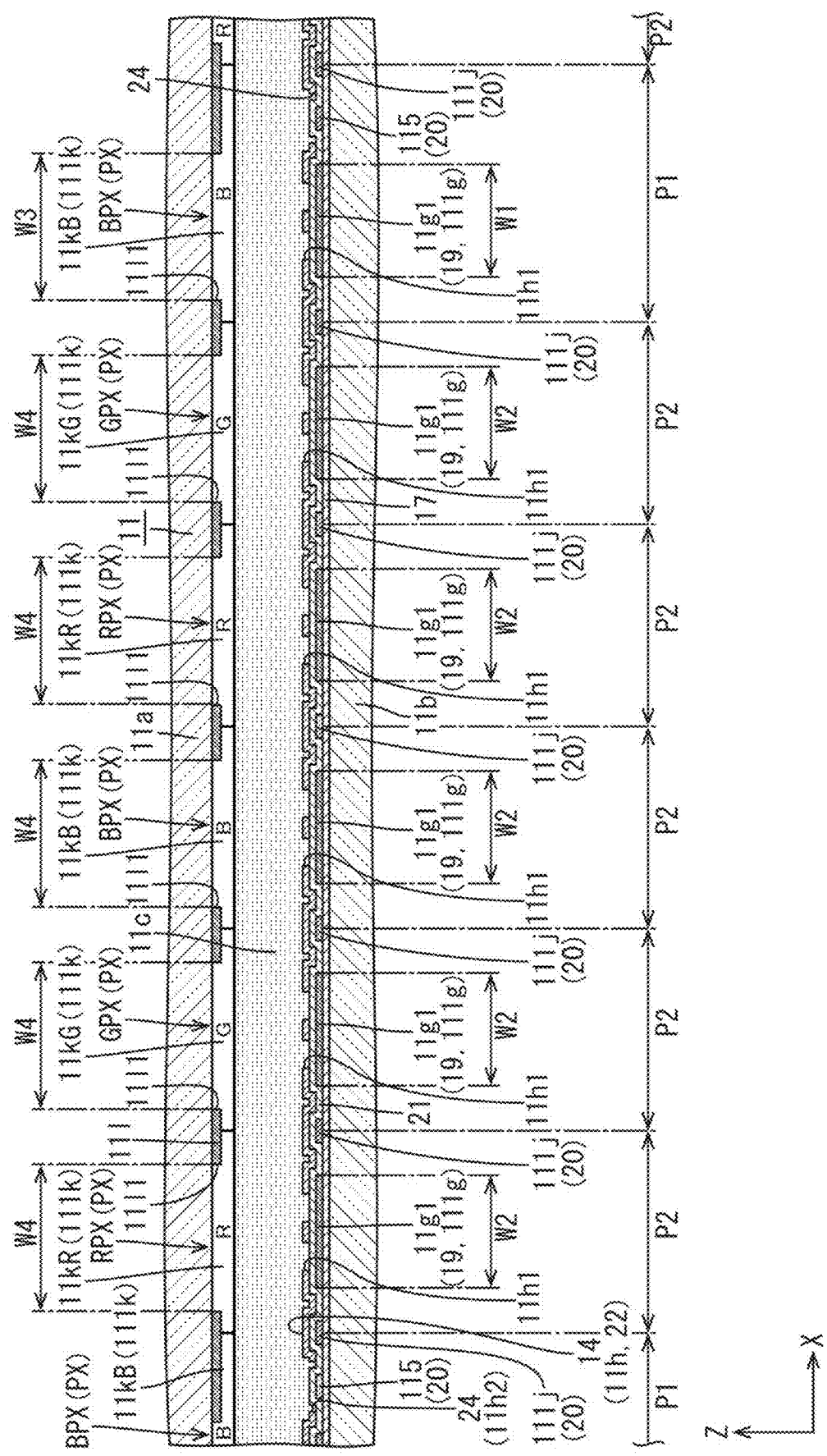
FIG. 6 is a cross-sectional view along line B-B in FIG. 5.

As illustrated in FIGS. 5 and 6, the touch lines 115 in this embodiment are arranged at intervals such that six pixel electrodes 111*g* and six source lines 111*j* are sandwiched between every two of the touch lines 115. The number of the pixel electrodes 111*g* or the source lines 111*j* sandwiched between every two of the touch lines 115 that are arranged at intervals in the X-axis direction is twice (or a multiple of) the number of colors of color filters 111*k*. An interval between two touch lines 115 is about twice the interval in the first embodiment. Six pixel electrodes 111*g* sandwiched between two touch lines 115 include two pixel electrodes 111*g* included in the blue pixel BPX, two pixel electrodes 111*g* included in the green pixel BPX, and two pixel electrodes 111*g* included in the red pixel RPX. According to the configuration, in comparison to a configuration in which the number of the pixel electrodes 111*g* sandwiched between two touch lines 15 is equal to the number of colors of the color filters 11*k* as in the first embodiment (see FIG. 4), the number of the touch lines 115 is cut in half. Because the number and areas of the touch lines 115 are reduced, larger areas can be provided for the pixel electrodes 11*g*. According to the configuration, the aperture ratio of the pixels PX can be further increased.

As described above, this embodiment includes the color filters 111*k* that are configured to exhibit at least blue, green, and red colors and disposed to overlap the pixel electrodes 111*g*, respectively. The number of the pixel electrodes 111*g* sandwiched between every two of the touch lines 115 is a multiple of the number of colors of the color filters 111*k*. In comparison to a configuration in which the number of the pixel electrodes 111*g* sandwiched between the touch lines is equal to the number of colors of the color filters 111*k*, the number of the touch lines 115 is reduced. Therefore, larger areas can be provided for the pixel electrodes 111*g*. According to the configuration, the aperture ratio can be further increased.

Third Embodiment

A third embodiment of the present invention will be described with reference to FIGS. 7 and 8. The third embodiment includes touch lines 215 in arrangement different from the first embodiment. Configurations, functions, and effects similar to those of the first embodiment may not be described.

Figure 7:
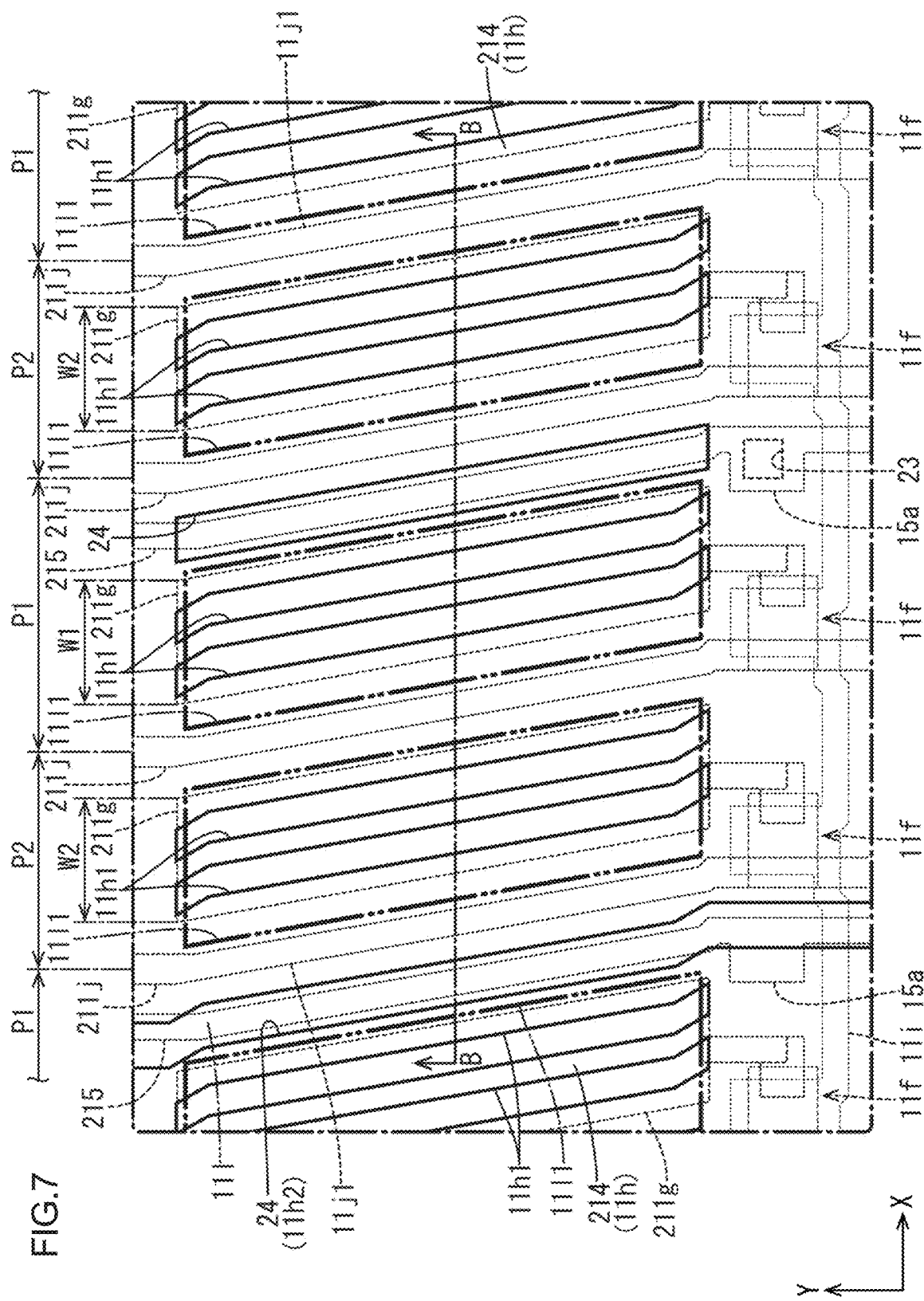
FIG. 7 is a plan view illustrating arrangement of pixels in an array substrate included in a liquid crystal panel according to a third embodiment of the present invention.
Figure 8:
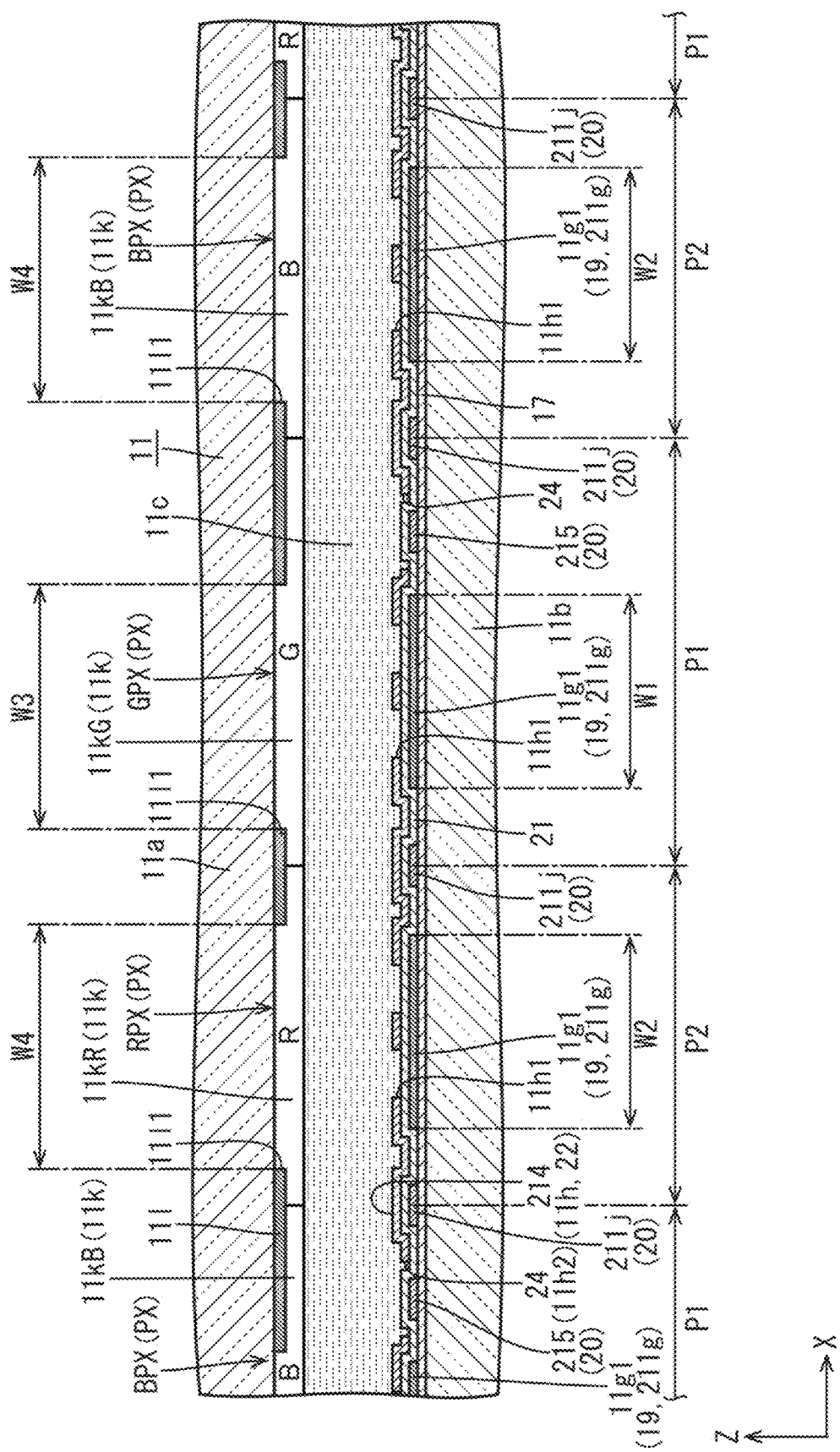
FIG. 8 is a cross-sectional view along line B-B in FIG. 7.

As illustrated in FIGS. 7 and 8, the touch lines 215 are arranged at intervals such that every two of the touch lines 215 sandwich two pixel electrodes 211*g* and two source lines 211*j*. The pixel electrode 211*g* that sandwich the touch line 215 with the source line 211*j* is not included in the pixel PX that is configured to exhibit the specific one of the colors. According to the configuration, the interval between the touch lines 215 is reduced and the number of the touch lines 215 is increased in comparison to the first embodiment. The connecting points at which touch electrodes 214 are connected can be increased. This configuration is preferable for increasing reliability in connection between the touch electrodes 214 and the touch lines 215.

Fourth Embodiment

A fourth embodiment of the present invention will be described with reference to FIGS. 9 to 11. The fourth embodiment includes a common electrode 311*h* that includes openings 324 different from the first embodiment. Configurations, functions, and effects similar to those of the first embodiment may not be described.

Figure 9:
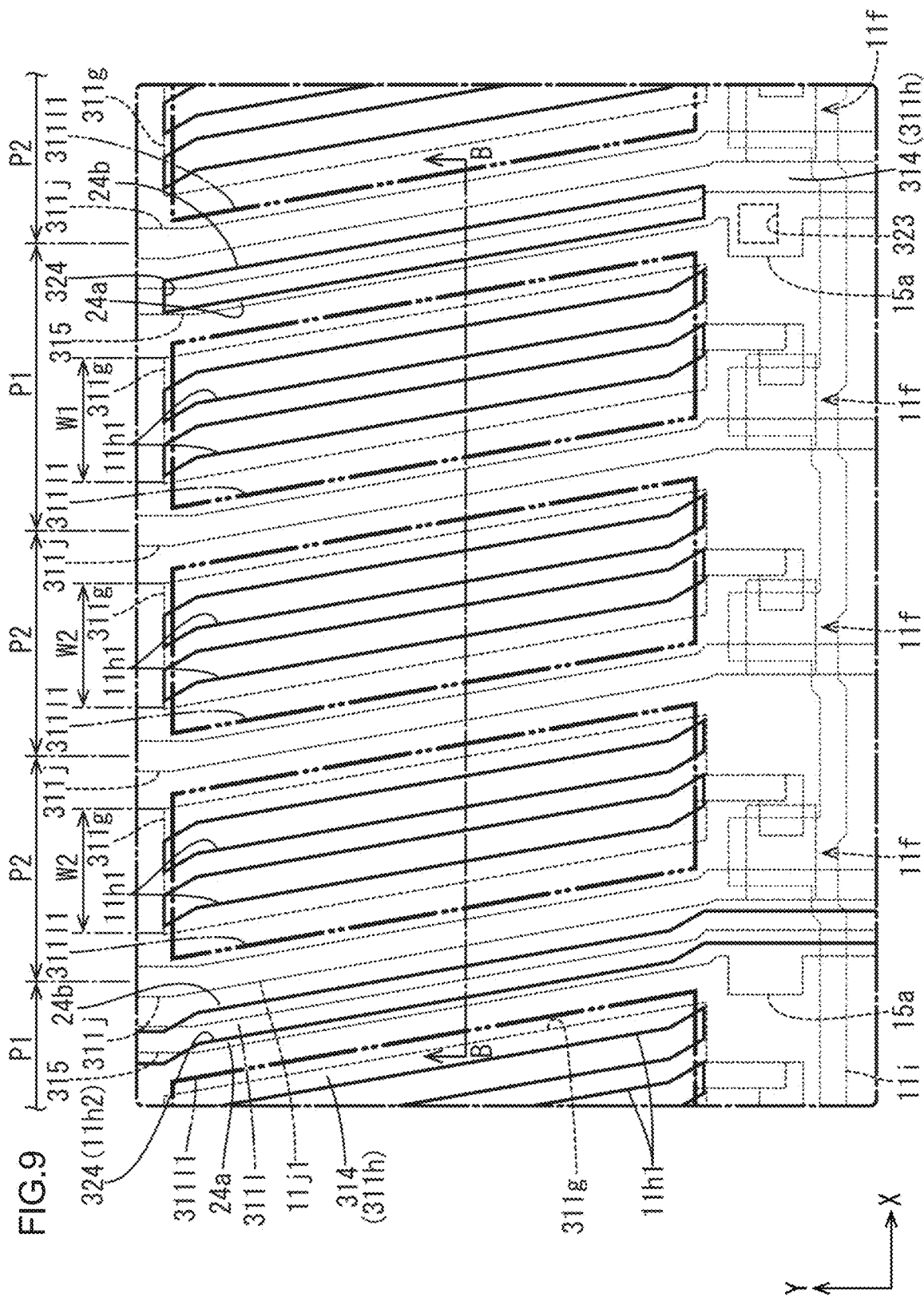
FIG. 9 is a plan view illustrating arrangement of pixels in an array substrate included in a liquid crystal panel according to a fourth embodiment of the present invention.
Figure 10:
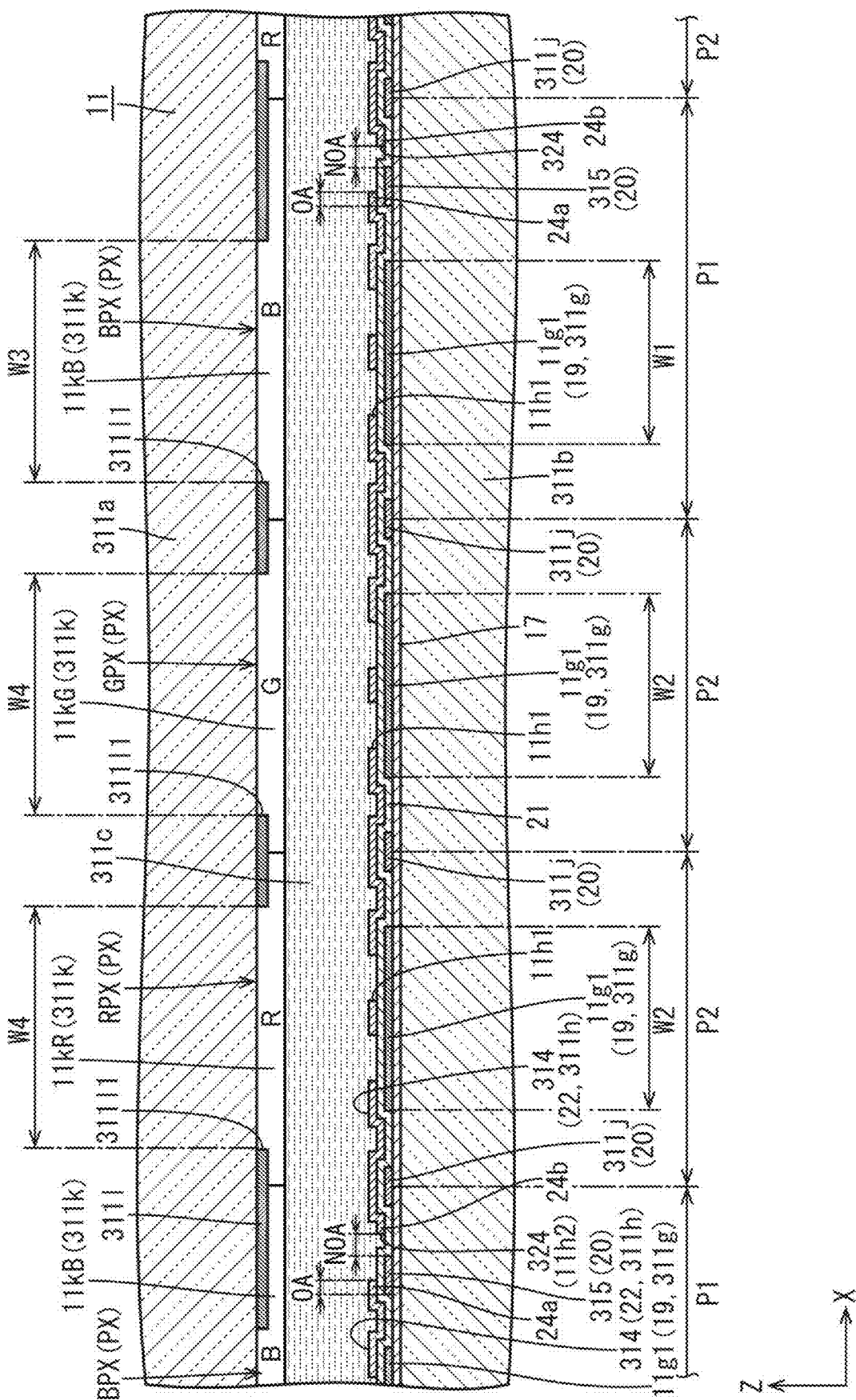
FIG. 10 is a cross-sectional view along line B-B in FIG. 9.
Figure 11:
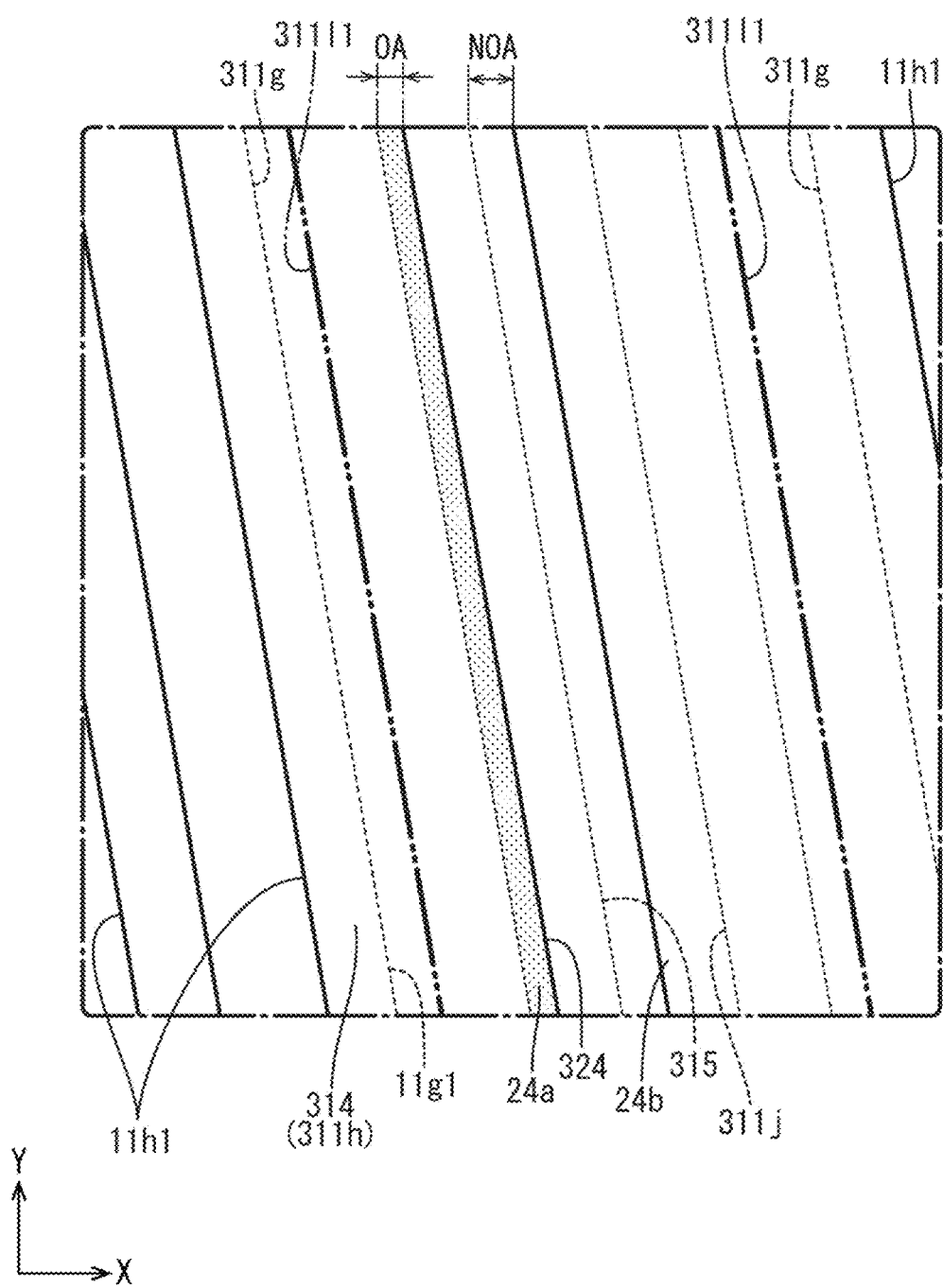
FIG. 11 is a magnified plan view of a portion including an opening illustrated in FIG. 9.

As illustrated in FIGS. 9 to 11, in the common electrode 311*h* in this embodiment, a first opening edge 24*a* and a second opening edge 24*b* of each opening 324 are located closer to a pixel electrode 311*g* (on the left side in FIGS. 9 to 11) relative to a touch line 315 in the X-axis direction (a width direction of the opening 324, in an arrangement direction of the touch lines 315 and source lines 311*j*) and closer to the source line 311*j* (on the right side in FIGS. 9 to 11), respectively. The first opening edge 24*a* is closer to the touch line 315 than the second opening edge 24*b*. The first opening edge 24*a* of the opening 324 closer to the touch line 315 is disposed closer to an opening edge of a pixel opening 31111 in a light blocking portion 3111 of a CF substrate 311*a* than the second opening edge 24*b*. The second opening edge 24*b* farther from the touch line 315 is disposed closer to a color border of color filters 311*k* than the first opening edge 24a. The color filters are adjacent to each other in the X-axis direction on the CF substrate 311a and configured to exhibit different colors.

If the opening 24 in the common electrode 11h is wider than the touch line 15 and gaps are provided between the opening edges and the touch line 15 in a plan view as in the first embodiment, an electric field created at the opening edges opposed to the gaps may create leakages of light around the gap, resulting in a reduction in display quality (see FIGS. 2 and 4). To reduce the leakages of light, areas of the light blocking portion 111 of the CF substrate 11a may be expanded. However, the pixel openings 1111 may be reduced and the aperture ratio of the pixels PX may be reduced. If the first opening edge 24a of the opening 324 is closer to the touch line 315 than the second opening edge 24b in the common electrode 311h as illustrated in FIGS. 10 and 11, a larger amount of light is blocked by the touch line 315 around the first opening edge 24a of the opening 324 in comparison to around the second opening edge 24b. Therefore, the leakage of light resulting from the electric field created at the first opening edge 24a is less likely to occur in comparison to the leakage of light resulting from the electric field created at the second opening edge 24b. According to the configuration, the leakage of light is less likely to occur around the first opening edge 24a of the opening 324, that is, on a pixel electrode 311g side (on a opening edge side of the pixel opening 31111) relative to the touch line 315. It is not necessary to expand the areas of the light blocking portion 3111 as much to the pixel electrode 311g side relative to the touch line 315. Therefore, the pixel openings 31111 can be provided in a sufficient size. According to the configuration, the decrease in aperture ratio of the pixels PX can be reduced.

As illustrated in FIG. 10, the light blocking portion 3111 is disposed on the CF substrate 311a that is bonded to an array substrate 311b. To properly block the leakage of light, it is necessary to define dimensions of the light blocking portion 111 in consideration of allowances in positioning of the substrates 11a and 11b during the bonding. In the configuration that is less likely to cause the leakage of light on the pixel electrode 11g side (closer to the first opening edges 24a of the openings 324) relative to the touch lines 315, about halves of the allowances (e.g., about 5 µm) are required for the dimensions of the light blocking portion 3111 because only the leakage of light on the source line 311j side (on a color border side of the color filters 311k) relative to the touch lines 315 needs to be considered. In a configuration in which pitches in arrangement of the pixels PX decrease as the definition increases, a decrease in aperture ratio of the pixels PX can be further properly suppressed. The common electrode 311h and the touch lines 315 are disposed on the array substrate 311b. Therefore, it is not necessary to consider the allowances to define positional relationships between the touch lines 315 and the first opening edges 24a or the second opening edges 24b of the openings 324 in the common electrode 311h. Even if the allowances are added to the dimensions of the light blocking portion 3111 on the CF substrate 311a, the size of the pixel openings 31111 is less likely to be reduced and thus the aperture ratio is less likely to be reduced.

As illustrated in FIGS. 10 and 11, the second opening edges 24b of the openings 324 in the common electrode 311h does not overlap the touch lines 315 but the first opening edges 24a overlap the touch lines 315. In FIG. 11, an overlapping area OA between the touch line 315 and the first opening edge 24a of the opening 324 in the common electrode 311h is shaded. The first opening edges 24a of the openings 324 overlap edges of the touch lines 315 on the pixel electrodes 311g with respect to the X-axis direction (the opening edge side of the pixel openings). However, the second opening edges 24b are away from the edges of the touch lines 315 on the source line 311j side with respect to the X-axis direction (on the color boarder side of the color filters 311k), that is, do not overlap the touch lines 315. A width of the overlapping area OA between the first opening edge 24a and the touch line 315 is smaller than a distance between the second opening edge 24b and the touch line 315, that is, a width of the non-overlapping area NOA. Specifically, the width between the first opening edge 24a and the touch line 315 is about a half of the width of the non-overlapping area NOA. A length of the overlapping area OA between the first opening edge 24a and the touch line 315 is equal to the length of the opening 324. According to the configuration, a gap is present between the second opening edge 24b of the opening 324 and the touch line 315 in a plan view but such a gap is not present between the first opening edge 24a of the opening 324 and the touch line 315. Rays of light traveling from the backlight unit toward the second opening edge 24b may enter a liquid crystal layer 311c through the gap and create a leakage of light due to an electric field created at the second opening edge 24b. Rays of light traveling from the backlight unit toward the first opening edge 24a are more likely to be blocked by the touch line 315 and thus a leakage of light is less likely to be created. Without the light blocking portion 3111 of the CF substrate 311a, the leakage of light is more likely to be reduced on the pixel electrode 311g side relative to the touch line 315. Therefore, a larger size of the pixel openings 31111 can be provided in the light blocking portion 3111 and thus the aperture ratio of the pixels PX is further less likely to be reduced.

As described above, this embodiment includes the light blocking portion 3111 for blocking light. The light blocking portion 3111 includes the pixel openings 31111 that are arranged to overlap at least the sections of the pixel electrodes 311g. This embodiment includes multiple touch electrodes 314. The touch lines 315 are selectively connected to the touch electrodes 314 via contact holes 323. The common electrode 311h includes the openings 324 that overlap at least the sections of the touch lines 315. The first opening edge 24a of each opening 324 closer to the pixel electrode 311g relative to the touch line 315 is disposed closer to the touch line 315 in comparison to the second opening edge 24b on the opposite side from the pixel electrode 311g relative to the touch line 315. Because the common electrode 311h includes the openings 324 that overlap at least the sections of the touch lines 315, parasitic capacitances between the touch lines 315 and the touch electrodes 314 that are not connected to the touch lines 315 are reduced. According to the configuration, proper sensitivity can be achieved in the position detection. If gaps are provided between the opening edges of the openings in the common electrode and the touch lines 315 in a plan view, the electric fields created at the opening edges opposed to the gaps may cause the leakages of light around the gap, resulting in a decrease in display quality. To reduce the leakages of light, the areas of the light blocking portion 3111 may be expanded. However, the pixel openings 31111 may be reduced and the aperture ratio may be reduced. In the common electrode 311h, the first opening edge 24a of each opening 324 located closer to the pixel electrode 311g relative to the touch line 315 is closer to the touch line 315 than the second opening edge 24b located on the opposite side from the pixel electrode 311g relative to the touch line 315. Therefore, the leakages of light are less likely to occur on the pixel electrode 311g side relative to the touch lines 315. It is not necessary to expand the areas of the light blocking portion 311I on the pixel electrode 311g side relative to the touch lines 315. Therefore, the pixel openings 3111I are provided in sufficient size. According to the configuration, the reduction in aperture ratio can be reduced.

Fifth Embodiment

Figure 12:
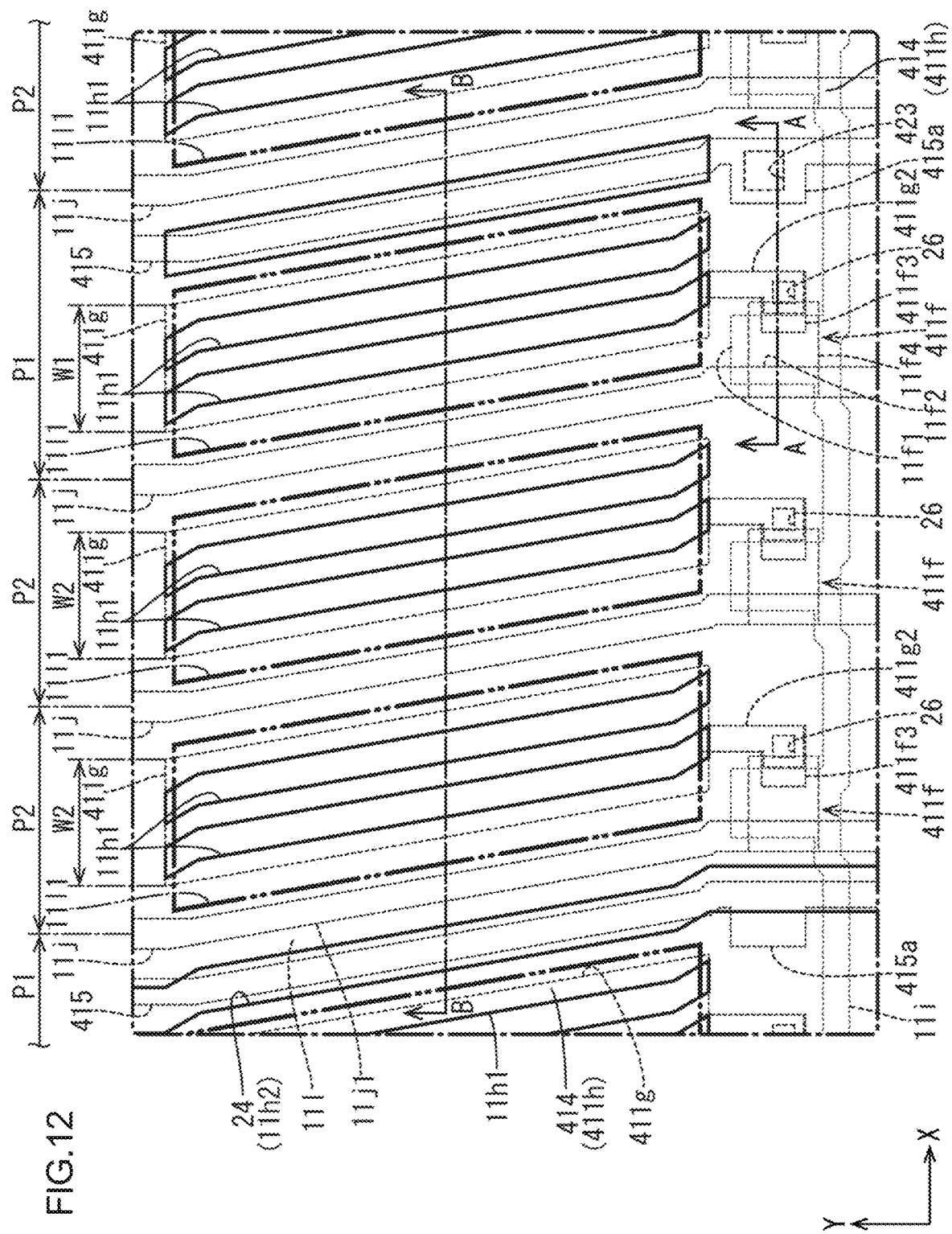
FIG. 12 is a plan view illustrating arrangement of pixels in an array substrate included in a liquid crystal panel according to a fifth embodiment of the present invention.

A fifth embodiment of the present invention will be described with reference to FIGS. 12 to 14. The fifth embodiment includes a second interlayer insulating film 25 in addition to the configuration of the first embodiment. Configurations, functions, and effects similar to those of the first embodiment may not be described.

Figure 13:
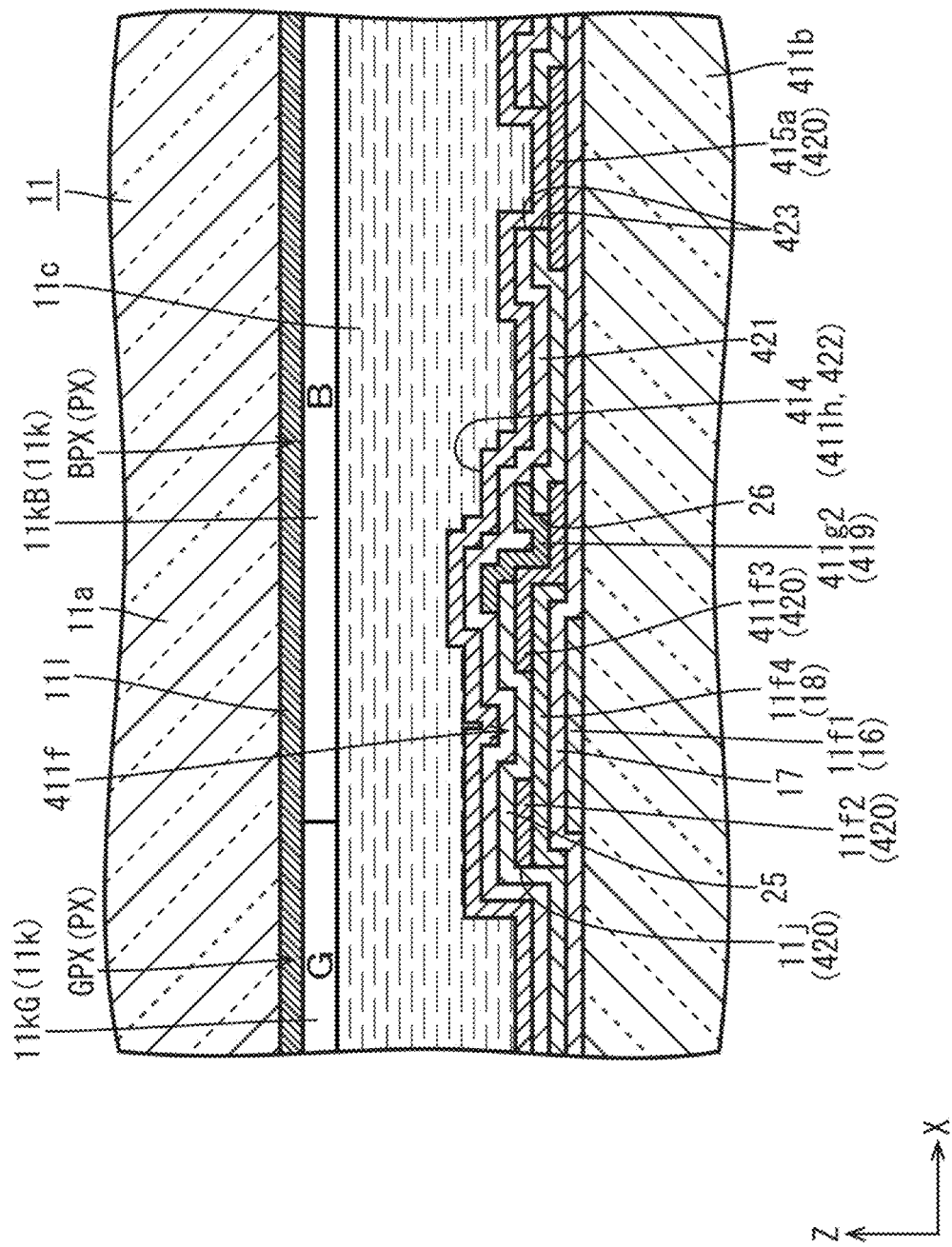
FIG. 13 is a cross-sectional view along line A-A in FIG. 12.
Figure 14:
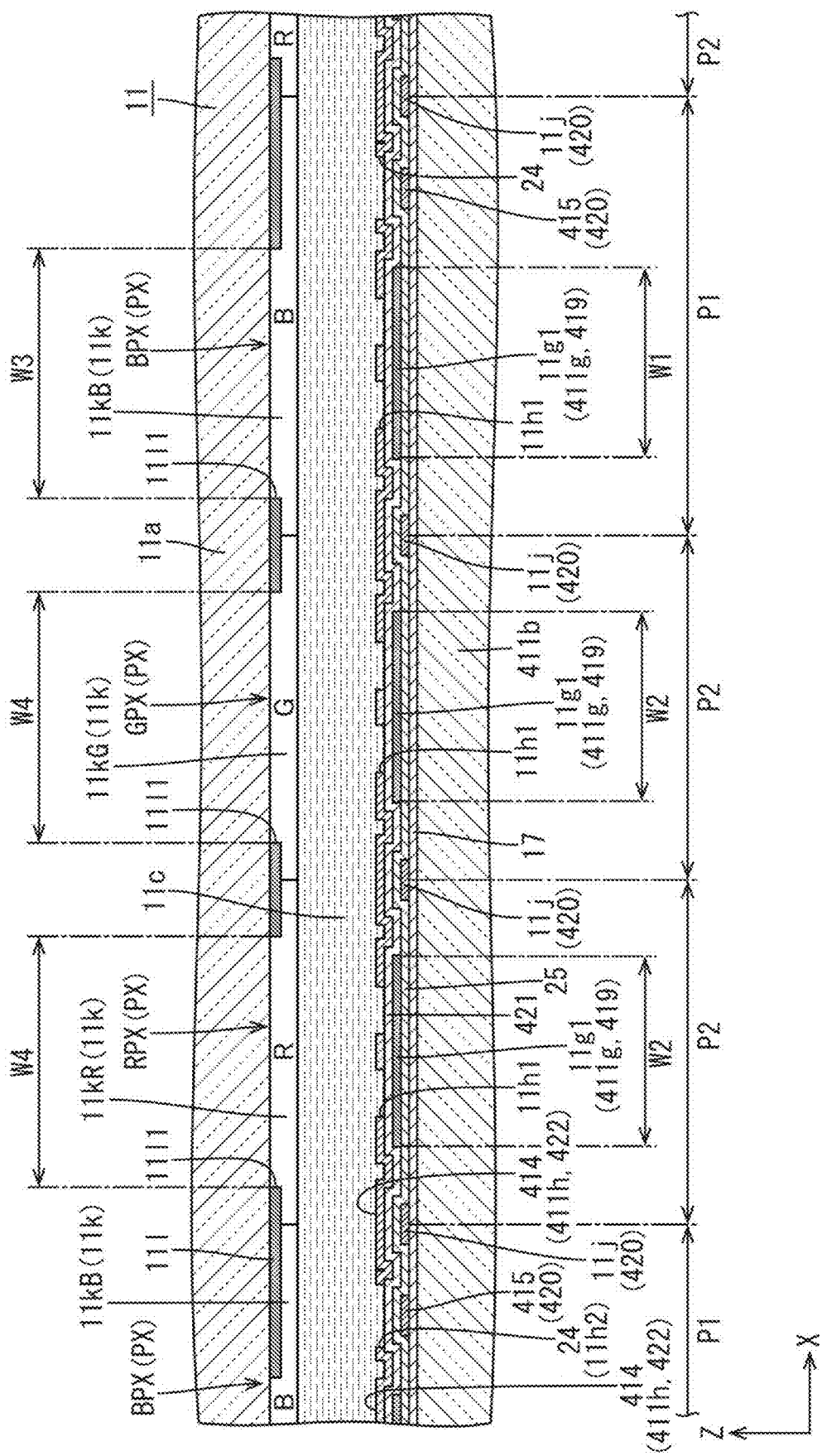
FIG. 14 is a cross-sectional view along line B-B in FIG. 12.

As illustrated in FIGS. 13 and 14, the second interlayer insulating film 25 (the second insulating film) is disposed between a first transparent electrode film 419 and a second metal film 420 on an array substrate 411b. The second interlayer insulating film 25 is made of an inorganic material, similar to an interlayer insulating film 421. The second interlayer insulating film 25 insulates the first transparent electrode film 419 from the second metal film 420. The first transparent electrode film 419 is disposed in a layer upper than the second interlayer insulating film 25. The second metal film 420 is disposed in a layer lower than the second interlayer insulating film 25. In this configuration, the interlayer insulating film 421 and the second interlayer insulating film 25 are disposed between a common electrode 411h prepared from a second transparent electrode film 422 and touch lines 415 prepared from the second metal film 420 and between touch electrodes 414 and the touch lines 415. As illustrated in FIGS. 12 and 13, contact holes 423 for connecting the touch lines 415 (wide portions 415a) to the touch electrodes 414 are formed in the interlayer insulating film 421 and the second interlayer insulating film 25 to communicate each other. According to the configuration, a distance between each touch line 415 and the corresponding touch electrode 414 that is not connected to the touch line 415 in the Z-axis direction is increased by the thickness of the second interlayer insulating film 25. Therefore, a parasitic capacitance between the touch line 415 and the touch electrode 414 is reduced. According to the configuration, proper sensitivity can be achieved in the position detection. Drain electrodes 411f3 connected to contact portions 411g2 of pixel electrodes 411g via pixel contact holes 26. The drain electrodes 411f3 are prepared from the second metal film 420 an included in TFTs 411f. The pixel electrodes 411g are prepared from the first transparent electrode film 419. The pixel contact holes 26 are through holes formed in the second interlayer insulating film 25. The pixel contact holes 26 are two-dimensionally arranged at positions at which contact holes 411g2 in the pixel electrodes 411g overlap the drain electrodes 411f3 of the TFTs 411f, respectively.

As described above, this embodiment includes the touch electrodes 414. The touch lines 415 are disposed on an opposite side from the common electrode 411h relative to the pixel electrodes 411g via the second interlayer insulating film 25. The touch lines 415 are selectively connected to the touch electrodes 414 via the contact holes 423 in the interlayer insulating film 421 and the second interlayer insulating film 25. Namely, the interlayer insulating film 421 and the second interlayer insulating film 25 are disposed between the common electrode 411h and the touch lines 415. Therefore, a parasitic capacitance between each touch line 415 and the corresponding touch electrode 414 that is not connected to the touch line 415 is reduced. According to the configuration, proper sensitivity can be achieved in the position detection.

Sixth Embodiment

A sixth embodiment of the present invention will be described with reference to FIG. 15. The sixth embodiment includes a third metal film 27 in addition to the configuration of the fifth embodiment. Configurations, functions, and effects similar to those of the fifth embodiment may not be described.

Figure 15:
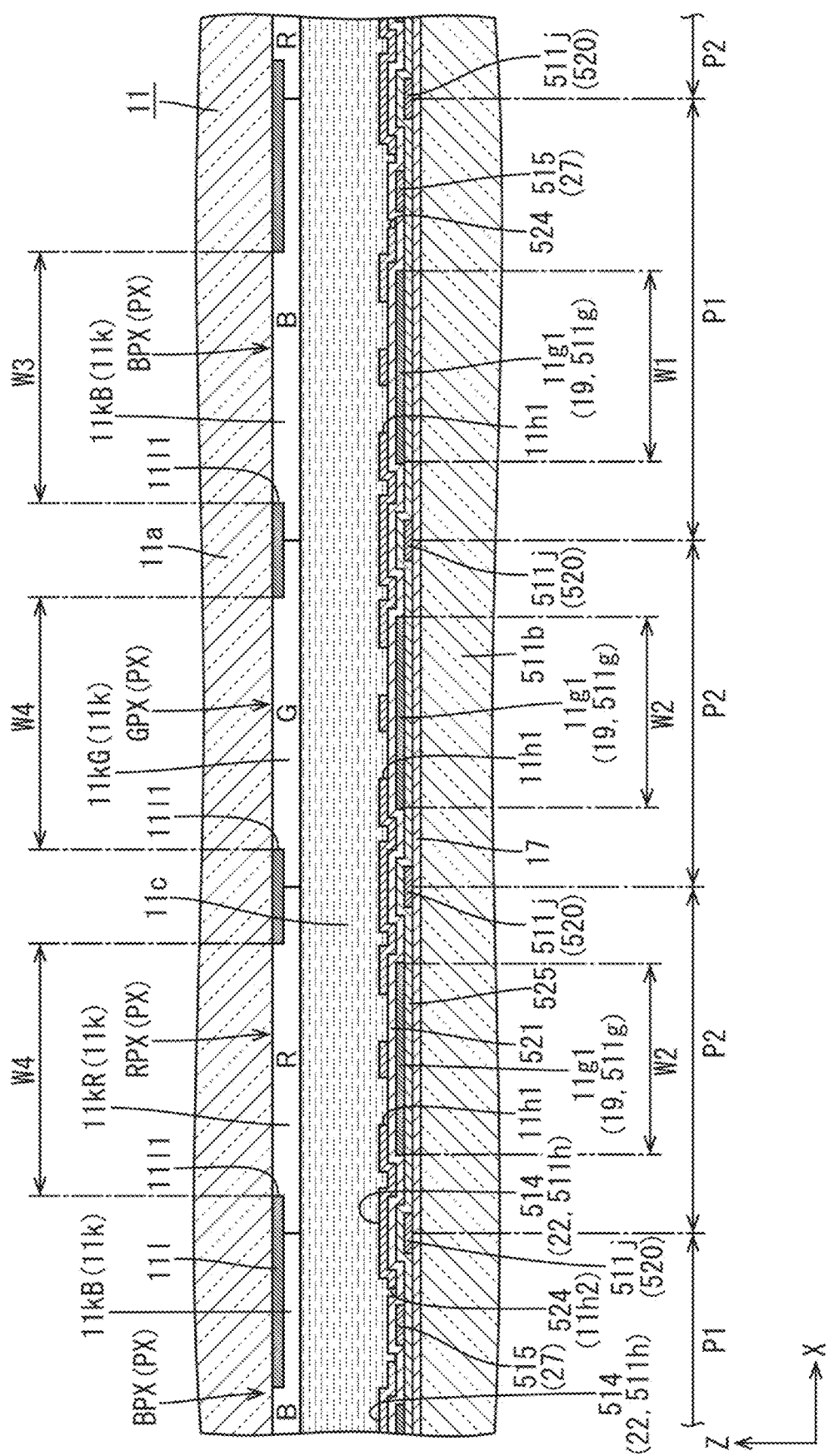
FIG. 15 is a cross-sectional view along center lines of pixels in a liquid crystal panel according to a sixth embodiment of the present invention.

As illustrated in FIG. 15, the third metal film 27 is disposed between the second interlayer insulating film 25 and an interlayer insulating film 521 on an array substrate 511b in this embodiment. The third metal film 27 may be a single-layer film made of one kind of metal, a multilayer film made of a material containing different kinds of metals, or an alloy, similar to the first metal film (not illustrated) and a second metal film 520. The third metal film 27 has conductivity and light blocking properties. The second metal film 520 does not include sections that are configured as touch lines 515. Sections of the second metal film 520 are configured as source lines 511j and source electrodes and drain electrodes of TFTs, which are not illustrated. The touch lines 515 are disposed in a layer upper than a second interlayer insulating film 525 and in a layer in which pixel electrodes 511g are disposed. The source lines 511j are disposed in a layer lower than the pixel electrodes 511g via the second interlayer insulating film 525, that is, on an opposite side from a common electrode 511h. The common electrode 511h includes openings 524 that overlap at least sections of the touch lines 515. Therefore, a parasitic capacitance between each touch line 515 and a corresponding touch electrode 514 that is not connected to the touch line 515 is reduced. According to the configuration, proper sensitivity can be achieved in the position detection. When signals are transmitted through the source lines 511j, electric fields may be created between the source lines 511j and opening edges of the openings 524 in the common electrode 511h. The electric fields may induce leakages of light around the openings 524. Because the second interlayer insulating film 525 is disposed between the common electrode 511h and the source lines 511j in addition to the interlayer insulating film 521, the strengths of the electric fields between the source lines 511j and the common electrode 511h are reduced. According to the configuration, the leakages of light are less likely to be caused by the source lines 511j around the openings 524.

As described above, in this embodiment, the common electrode 511h includes the openings 524 that overlap at least the sections of the touch lines 515. The source lines 511j are disposed on the opposite side from the common electrode 511h relative to the pixel electrodes 511g via the second interlayer insulating film 525. Because the common electrode 511h includes the openings 524 that overlap at least the sections of the touch lines 515, a parasitic capacitance between each touch line 515 and the corresponding touch electrode 514 that is not connected to the touch line 515 is reduced. According to the configuration, proper sensitivity can be achieved in the position detection. When signals are transmitted through the source lines 511j, electric fields may be created between the source lines 511j and the opening edges of the openings 524 in the common electrode 511h. The electric fields may induce leakages of light around the openings 524. Because the second interlayer insulating film 525 is disposed between the common electrode 511h and the source lines 511*j* in addition to the interlayer insulating film 521. Therefore, the strengths of the electric fields between the source lines 511*j* and the common electrode 511*h* are reduced. According to the configuration, the leakages of light are less likely to be caused by the source lines 511*j* around the openings 524.

Seventh Embodiment

Figure 16:
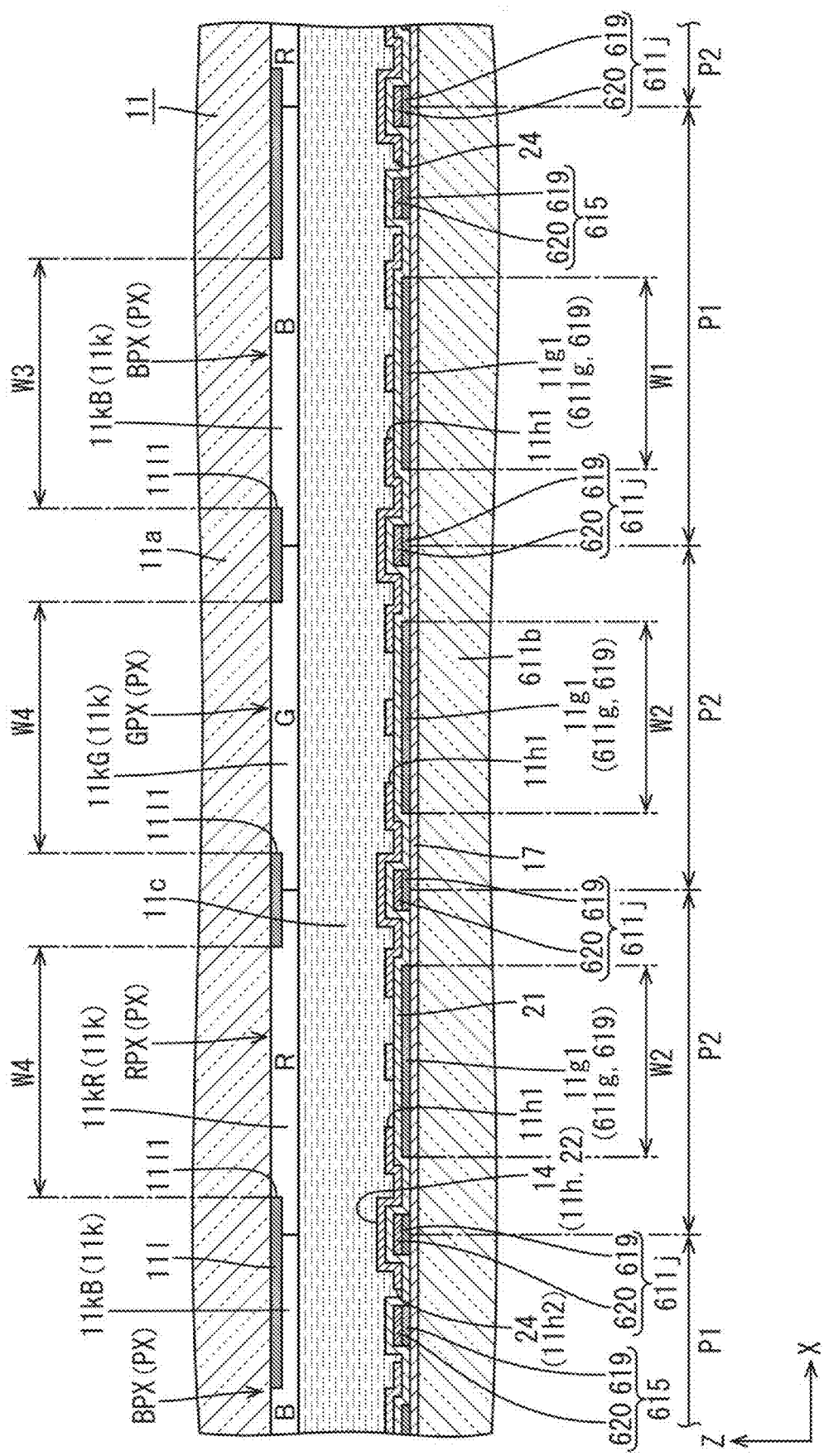
FIG. 16 is a cross-sectional view along center lines of pixels in a liquid crystal panel according to a seventh embodiment of the present invention.

A seventh embodiment will be described with reference to FIG. 16. The seventh embodiment includes source lines 611*j* and touch lines 615 having configurations different from those in the first embodiment. Configuration, functions, and effects similar to those of the first embodiment may not be described.

As illustrated in FIG. 13, the source lines 611*j* and the touch lines 615 in this embodiment are prepared from a first transparent electrode film 619 and a second metal film 620 that are laminated. According to the configuration, pixel electrodes 611*g*, the source lines 611*j*, and the touch lines 615 are prepared through patterning with a single photomask in a production of an array substrate 611*b*. Because the source lines 611*j* and the touch lines 615 are prepared from the first transparent electrode film 619 and the second metal film 620 that are laminated, resistances of lines can be reduced. Furthermore, the source lines 611*j* and the touch lines 615 have redundancy. Therefore, the lines are less likely to be disconnected. To form the pixel electrodes 611*g*, the source lines 611*j*, and the touch lines 615 through patterning, the first transparent electrode film 619 and the second metal film 620 are consecutively formed, the photoresist is formed, and then exposure is performed using a halftone mask, which is not illustrated. The halftone mask includes transmissive areas, semi-transmissive areas, and light blocking areas. The transmissive areas pass exposure light applied by an exposure device with a transmission rate of about 100%. The semi-transmissive areas pass the exposure light with a transmission rate of about 10% to 70%. The light blocking areas block the exposure light. The transmissive areas or the light blocking areas are disposed to overlap areas in which the source lines 611*j* and the touch lines 615 are formed in a plan view. The semi-transmissive areas are disposed to overlap areas in which the pixel electrodes 611*g* are formed in the plan view. After the exposure using the halftone mask, etching is performed. Remaining sections of the first transparent electrode film 619 and the second metal film 620 are defined as the source lines 611*j* and the touch lines 615. Remaining sections of the first transparent electrode film 619 without the second metal film 620 are defined as the pixel electrodes 611*g*. Because the pixel electrodes 611*g*, the source lines 611*j*, and the touch lines 615 can be prepared through the patterning using the single photomask, this configuration is preferable for reducing the production cost.

Other Embodiments

The present invention is not limited to the embodiments described above and illustrated by the drawings. For example, the following embodiments will be included in the technical scope of the present invention.

(1) In each of the above embodiments, two, three, or six pixel electrodes and two, three, or six source lines are sandwiched between every two of the touch lines that are arranged in the X-axis direction. However, four, five, seven or more pixel electrodes and four, five, seven or more source lines may be sandwiched between every two of the touch lines. The method described in the second embodiment section may be used. Namely, the number of the pixel electrodes or the number of the source lines sandwiched between every two of the touch lines may be defined by multiplying the number of colors of the color filters by an integer that is three or larger. With this method, each touch line is sandwiched between the corresponding pixel electrode that overlaps the color filter that exhibits specific one of the colors and the corresponding source line.

(2) In each of the above embodiments (except for the third embodiment), the touch lines are regularly arranged such that each touch line is sandwiched between the corresponding pixel electrode that overlaps the blue color filter and the corresponding source line. However, the touch lines may be regularly arranged such that each touch line is sandwiched between the corresponding pixel electrode that overlaps the green color filter or the red color filter and the corresponding source line. In such a configuration, it is preferable that the touch lines are regularly arranged such that each touch line is sandwiched between the corresponding pixel electrode that overlaps the red color filter that exhibits the red color that is the second least recognizable color after the blue color and the corresponding source line.

(3) In each of the above embodiments, the red, the green, and the blue color filters, that is, the filters having a three-color configuration are used. However, the present invention can be applied to red, green, blue, and yellow or white color filters, that is, filters having a four-color configuration. The number of colors of the color filters may be altered to five or larger.

(4) In the fourth embodiment, the first opening edge of each opening in the common electrode is disposed to overlap the section of the corresponding touch line. However, the first opening edge and the second opening edge of the opening in the common electrode may be disposed not to overlap the corresponding touch line.

(5) In each of the above embodiments, the dividing openings in the common electrode overlap the touch lines. However, the dividing openings may be provided not to overlap the touch lines.

(6) In each of the above embodiments, the first transparent electrode film and the second metal film are disposed in the upper layer and the lower layer, respectively. However, the first transparent electrode film and the second metal film may be disposed in the lower layer and the upper layer, respectively.

(7) In each of the above embodiments, the source line is disposed closer to the pixel electrode that is connected to the source line with the gap between the touch line and the source line. However, the source line may be disposed closer to the pixel electrode that is not connected to the source line with a gap between the touch line and the source line.

(8) The technical matters in the above embodiments may be combined where appropriate.

(9) In the fifth embodiment, the pixel electrodes are prepared from the first transparent electrode film disposed in the lower layer and the common electrode is prepared from the second transparent electrode film disposed in the upper layer. However, the common electrode may be prepared from the first transparent electrode film and the pixel electrodes may be prepared from the second transparent electrode film.

(10) In the fifth embodiment, the common electrode includes the pixel overlapping openings for the alignment of the liquid crystal molecules in the liquid crystal layer.

However, the pixel electrodes may include openings for the alignment of the liquid crystal molecules in the liquid crystal layer.

(11) In each of the above embodiments, the source lines include the diagonally extending portions. However, the source lines may include only linear portions that extend in the Y-axis direction without the diagonally extending portions.

(12) In each of the above embodiments, the light blocking portion is disposed on the CF substrate. However, the light blocking portion may be disposed on the array substrate.

(13) The semiconductor film that includes the portions configured as the channels of the TFTs may be made of polysilicon. In such a configuration, it is preferable that the TFTs have a bottom-gate configuration.

(14) In each of the above embodiments, the touch panel pattern uses the self-capacitance method. However, a touch screen pattern that uses a mutual-capacitance method may be used.

(15) The transmissive liquid crystal panel is described in each of the above embodiment sections. However, the technology described herein may be applied to reflective liquid crystal panels and semitransmissive liquid crystal panels.

(16) The liquid crystal display device (the liquid crystal panel or the backlight unit) having the horizontally-long rectangular shape in the plan view is described in each of the above embodiment sections. However, the technology described herein may be applied to liquid crystal display devices having vertically-long rectangular shapes, square shapes, circular shapes, semicircular shapes, oval shapes, and trapezoidal shapes.

(17) The liquid crystal panel including the liquid crystal layer sandwiched between the substrates is described in each of the above embodiment sections. However, the technology described herein may be applied to display panels each including functional organic molecules other than the liquid crystals sandwiched between the substrates.

EXPLANATION OF SYMBOLS

10: Liquid crystal display device (Display device with position input function), 11a, 311a: CF substrate (Common substrate), 11b, 311b, 411b, 511b, 611b: Array substrate, 11g, 111g, 211g, 311g, 411g, 511g, 611g: Pixel electrode, 11h, 311h, 411h, 511h: Common electrode, 11j, 111j, 211j, 311j, 511j, 611j: Source line (Signal line), 11k, 111k, 311k: Color filter, 11kB: Blue color filter (Color filter configured to exhibit blue color), 11kG: Green color filter (Color filter configured to exhibit green color), 11kR: Red color filter (Color filter configured to exhibit red color), 111, 3111: Light blocking portion, 1111, 31111: Pixel opening, 14, 214, 314, 414, 514: Touch electrode (Position detection electrode), 15, 115, 215, 315, 415, 515, 615: Touchlines (Position detection lines), 21, 421, 521: Interlayer insulating film (Insulating film), 23, 423: Contact hole, 24, 324, 524: Opening, 24a: First opening edge, 24b: Second opening edge, 25, 525: Second interlayer insulating film (Second insulating film), Gap: P1, P2

The invention claimed is:

1. A display device with a position input function comprising:
   a plurality of pixel electrodes;
   a plurality of signal lines configured to transmit signals supplied to the pixel electrodes, respectively, and disposed adjacent to the pixel electrodes;
   a common electrode disposed to at least partially overlap the pixel electrodes via an insulating film;
   at least one position detection electrode prepared by dividing the common electrode and configured so that a position input member for position input operation and the at least one position detection electrode form a capacitor to detect a position of input by the position input member; and
   a plurality of position detection lines disposed such that at least the insulating film is disposed between the common electrode and the position detection lines and connected to the at least one position detection electrode via at least one contact hole formed in at least the insulating film, each of the position detection lines being disposed between corresponding one of the signal lines and corresponding one of the pixel electrodes such that two of the position detection lines sandwich at least some of the pixel electrodes and some of the signal lines, wherein
   an interval between two of the signal lines that sandwich corresponding one of the pixel electrodes and corresponding one of the position detection lines is larger than an interval between two of the signal lines that sandwich corresponding one of the pixel electrodes;
   the at least one position detection electrode includes position detection electrodes; and
   the position detection lines are disposed on an opposite side from the common electrode relative to the pixel electrodes via a second insulating film and selectively connected to the position detection electrodes via contact holes of the at least one contact hole defined in the insulating film and the second insulating film.

2. The display device with the position input function according to claim 1, further comprising a plurality of color filters disposed to overlap the pixel electrodes and configured to exhibit at least blue, green, and red colors, wherein
   each of the position detection lines is sandwiched between one of the pixel electrodes that overlaps one of the color filters that exhibit specified one of the colors and corresponding one of the signal lines.

3. The display device with the position input function according to claim 2, wherein the position detection lines are disposed such that each of the position detection lines sandwiched between one of the pixel electrodes that overlaps one of the color filters that exhibits the blue color and corresponding one of the signal lines.

4. The display device with the position input function according to claim 1, further comprising a plurality of color filters disposed to overlap the pixel electrodes, respectively, and configured to exhibit at least blue, green, and red colors, wherein
   the position detection lines are disposed such that a number of the pixel electrodes sandwiched between every two of the position detection lines is a multiple of a number of colors of the color filters.

5. The display device with the position input function according to claim 1, wherein
   the signal lines are disposed adjacent to the pixel electrodes to which the signals are transmitted, and
   each of the position detection lines is disposed between corresponding one of the signal lines and corresponding one of the pixel electrodes to which the signals are transmitted through the corresponding one of the signal lines.

6. The display device with the position input function according to claim 1, further comprising a light blocking portion including pixel openings overlapping at least sections of the pixel electrodes, the light blocking portion being configured to block light, wherein the at least one position detection electrode includes position detection electrodes, the position detection lines are selectively connected to the position detection electrodes via the at least one contact hole, the common electrode includes openings overlapping at least sections of the position detection lines, each of the openings includes opening edges including a first opening edge and a second opening edge, the first opening edge is located closer to corresponding one of the pixel electrodes relative to corresponding one of the position detection lines, the second opening edge is located on an opposite side from the corresponding one of the pixel electrodes relative to the corresponding one of the position detection lines, and the first opening edge is closer to the corresponding one of the position detection lines than the second opening edge.

7. The display device with the position input function according to claim 1, wherein each of the pixel electrodes that are adjacent to the position detection lines has an area about equal to an area of each of the pixel electrodes that are not adjacent to the position detection lines.

8. A display device with a position input function comprising:

a plurality of pixel electrodes;

a plurality of signal lines configured to transmit signals supplied to the pixel electrodes, respectively, and disposed adjacent to the pixel electrodes;

a common electrode disposed to at least partially overlap the pixel electrodes via an insulating film;

at least one position detection electrode prepared by dividing the common electrode and configured so that a position input member for position input operation and the at least one position detection electrode form a capacitor to detect a position of input by the position input member; and a plurality of position detection lines disposed such that at least the insulating film is disposed between the common electrode and the position detection lines and connected to the at least one position detection electrode via at least one contact hole formed in at least the insulating film, each of the position detection lines being disposed between corresponding one of the signal lines and corresponding one of the pixel electrodes such that two of the position detection lines sandwich at least some of the pixel electrodes and some of the signal lines, a light blocking portion including pixel openings overlapping at least sections of the pixel electrodes, the light blocking portion being configured to block light, wherein an interval between two of the signal lines that sandwich corresponding one of the pixel electrodes and corresponding one of the position detection lines is larger than an interval between two of the signal lines that sandwich corresponding one of the pixel electrodes, the at least one position detection electrode includes position detection electrodes, the position detection lines are selectively connected to the position detection electrodes via the at least one contact hole, the common electrode includes openings overlapping at least sections of the position detection lines, each of the openings includes opening edges including a first opening edge and a second opening edge, the first opening edge is located closer to corresponding one of the pixel electrodes relative to corresponding one of the position detection lines, the second opening edge is located on an opposite side from the corresponding one of the pixel electrodes relative to the corresponding one of the position detection lines, and the first opening edge is closer to the corresponding one of the position detection lines than the second opening edge.

9. The display device with the position input function according to claim 8, further comprising a plurality of color filters disposed to overlap the pixel electrodes and configured to exhibit at least blue, green, and red colors, wherein each of the position detection lines is sandwiched between one of the pixel electrodes that overlaps one of the color filters that exhibit specified one of the colors and corresponding one of the signal lines.

10. The display device with the position input function according to claim 9, wherein the position detection lines are disposed such that each of the position detection lines sandwiched between one of the pixel electrodes that overlaps one of the color filters that exhibits the blue color and corresponding one of the signal lines.

11. The display device with the position input function according to claim 8, further comprising a plurality of color filters disposed to overlap the pixel electrodes, respectively, and configured to exhibit at least blue, green, and red colors, wherein the position detection lines are disposed such that a number of the pixel electrodes sandwiched between every two of the position detection lines is a multiple of a number of colors of the color filters.

12. The display device with the position input function according to claim 8, wherein the signal lines are disposed adjacent to the pixel electrodes to which the signals are transmitted, and each of the position detection lines is disposed between corresponding one of the signal lines and corresponding one of the pixel electrodes to which the signals are transmitted through the corresponding one of the signal lines.

13. The display device with the position input function according to claim 8, wherein the position detection lines and the signal lines are disposed in a layer in which the pixel electrodes are disposed.

14. The display device with the position input function according to claim 8, wherein the common electrode includes openings that overlap at least sections of the position detection lines, and the signal lines are disposed on an opposite side from the common electrode relative to the pixel electrodes via a second insulating film.

15. The display device with the position input function according to claim 8, wherein each of the pixel electrodes that are adjacent to the position detection lines has an area about equal to an area of each of the pixel electrodes that are not adjacent to the position detection lines.

\* \* \* \* \*